(12) United States Patent
Agiwal

(10) Patent No.: US 10,611,322 B2
(45) Date of Patent: Apr. 7, 2020

(54) SYSTEM AND METHOD OF REDUCING INTERRUPTIONS FOR VEHICLE TO VEHICLE COMMUNICATION

(71) Applicant: Samsung Electronics Co., Ltd., Suwon-si, Gyeonggi-do (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 15/627,953

(22) Filed: Jun. 20, 2017

(65) Prior Publication Data

US 2017/0366920 A1    Dec. 21, 2017

Related U.S. Application Data

(60) Provisional application No. 62/352,772, filed on Jun. 21, 2016.

(51) Int. Cl.
| | | |
|---|---|---|
| *G01C 21/00* | (2006.01) | |
| *B60R 16/023* | (2006.01) | |
| *H04W 4/70* | (2018.01) | |
| *H04L 5/00* | (2006.01) | |

(Continued)

(52) U.S. Cl.
CPC ........... *B60R 16/023* (2013.01); *G07C 5/008* (2013.01); *H04L 5/00* (2013.01); *H04L 5/0053* (2013.01); *H04W 4/70* (2018.02); *H04W 36/0072* (2013.01)

(58) Field of Classification Search
CPC ........ B60R 16/023; H04W 4/70; H04W 4/02; G07C 5/008; H04L 5/00
See application file for complete search history.

(56) References Cited

U.S. PATENT DOCUMENTS 8,280,421 B2 * 10/2012 Nanri .................... H04L 1/0001
                                                              455/458
8,626,167 B2 *  1/2014 Futaki .................. H04W 76/28
                                                              455/436

(Continued)

FOREIGN PATENT DOCUMENTS

| IN | 1128/KOL/2014 | 11/2015 |
|---|---|---|
| WO | 2009/099286 A1 | 8/2009 |

(Continued)

OTHER PUBLICATIONS

NPL—3GPP_TS36.331 (Year: 2015).*

(Continued)

*Primary Examiner* — Ian Jen
(74) *Attorney, Agent, or Firm* — Jefferson IP Law, LLP

(57) ABSTRACT

An apparatus and method are provided for transmitting signals in a vehicle to vehicle (V2V)/vehicle to everything (V2X) communication system. The method includes receiving a handover command message from a base station, the handover command message comprising information on a first resource pool, selecting a resource for transmitting data from a second resource pool without sensing the second resource pool, if the handover command message further comprises information on the second resource pool, and transmitting the data based on the resource for transmitting data from the second resource pool.

30 Claims, 29 Drawing Sheets

(51) Int. Cl.
  *H04W 36/00* (2009.01)
  *G07C 5/00* (2006.01)

(56) References Cited

U.S. PATENT DOCUMENTS

| | | | | |
|---|---|---|---|---|
| 8,666,414 | B2* | 3/2014 | Aramaki | H04W 74/0866 |
| | | | | 455/436 |
| 8,787,310 | B2* | 7/2014 | Sahara | H04W 52/322 |
| | | | | 370/329 |
| 8,838,117 | B2* | 9/2014 | Soliman | H04W 36/04 |
| | | | | 370/331 |
| 9,276,810 | B2* | 3/2016 | Bi | H04B 7/024 |
| 2007/0238463 | A1* | 10/2007 | Ogami | H04W 36/0033 |
| | | | | 455/436 |
| 2009/0186615 | A1* | 7/2009 | Kwon | H04W 36/04 |
| | | | | 455/436 |
| 2015/0271841 | A1 | 9/2015 | Yamada et al. | |
| 2015/0319774 | A1* | 11/2015 | Cai | H04W 72/14 |
| | | | | 370/329 |
| 2015/0334760 | A1 | 11/2015 | Sartori et al. | |
| 2016/0044552 | A1* | 2/2016 | Heo | H04L 5/001 |
| | | | | 370/331 |

FOREIGN PATENT DOCUMENTS

| | | |
|---|---|---|
| WO | 2014/124085 A1 | 8/2014 |
| WO | 2015/170871 A1 | 11/2015 |
| WO | 2016/048620 A1 | 3/2016 |

OTHER PUBLICATIONS

International Search Report dated Oct. 27, 2017, issued in the International Application No. PCT/KR2017/006474 dated Jun. 20, 2017.
LG Electronics Inc., "Introduction of V2V services based on LTE sidelink", 3GPP Draft, 36.300, R2-164580—Introduction of V2V Services Based on LTE Sidelink, 3rd Generation Partnership Project (3GPP), Mobile Competence Centre, 650, Route Des Lucioles, F-06921, vol. Ran WG2, No. Gothenburg, Sweden, XP05111263, Aug. 22, 2016.
Huawei et al., "Potential RAN2 issues for PC5-based V2V", 3GPP Draft, R2-156580 Potential RAN2 Issues for PC5-Based V2V, 3rd Generation Partnership Project (3GPP), Mobile Competence Centre, 650, Route Des Lucioles, F-06921 Sophia-Antipolis Cedex, France, vol. RAN WG2, No. Anaheim, US, XP051005957, Nov. 16, 2015.
Extended European Search Report dated Jan. 17, 2020, issued in European Patent Application No. 17815693.1.

* cited by examiner

SYSTEM AND METHOD OF REDUCING INTERRUPTIONS FOR VEHICLE TO VEHICLE COMMUNICATION

CROSS-REFERENCE TO RELATED APPLICATION(S)

This application claims the benefit under 35 U.S.C. § 119(e) of a U.S. Provisional application filed on Jun. 21, 2016 in the U.S. Patent and Trademark Office and assigned Ser. No. 62/352,772, the entire disclosure of which is hereby incorporated by reference.

TECHNICAL FIELD

The present disclosure relates to a device to device (D2D) communication system. More particularly, the present disclosure relates to vehicle to vehicle (V2V) or vehicle to everything (V2X) communication system and a method for transmission and reception.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), D2D communication, and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication, D2D communication, may be implemented by beamforming, MIMO, and array antennas. Application of a cloud RAN as the above-described Big Data processing technology may also be considered to be as an example of convergence between the 5G technology and the IoT technology.

D2D communication enables data communication services between the user equipment (UE). During the D2D communication (also referred as sidelink (SL) communication) a transmitting UE can transmit data packets to a group of UEs or broadcast data packets to all the UEs or send unicast data packets to a specific UE. Recently 3rd generation partnership project (3GPP) standard group has initiated work item to enhance the SL communication mechanism for vehicle to vehicle (V2V) or vehicle to everything (V2X) communication. One of the enhancements proposed for efficient transmission is to perform sensing for UE autonomous resource selection. According to present procedure, data transmission can be delayed significantly. Therefore, a need exists for reducing interruptions in data transmission using sensing for UE autonomous resource selection.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for reducing interruptions in vehicle to vehicle (V2V) transmission using sensing on resource pool for UE autonomous resource selection, thereby improving the system performance.

In accordance with an aspect of the present disclosure, a method for transmitting data of a user equipment (UE) is provided. The method includes receiving a handover command message from a base station, the handover command message comprising information on a first resource pool, selecting a resource for transmitting data from a second resource pool without sensing the second resource pool, if the handover command message further comprises information on the second resource pool, and transmitting the data based on the resource for transmitting data from the second resource pool.

In accordance with another aspect of the present disclosure, a method for transmitting information of a base station is provided. The method includes receiving information on at least one resource pool from another base station, and transmitting a handover command message comprising information on a first resource pool and information on a second resource pool based on the information on the at least one resource pool.

In accordance with another aspect of the present disclosure, a UE for transmitting data is provided. The UE includes a transceiver to transmit and receive signals, and at least one processor configured to control to receive a handover command message from a base station, the handover command message comprising information on a first resource pool, select a resource for transmitting data from a second resource pool without sensing the second resource pool, if the handover command message further comprises information on the second resource pool, and transmit the data based on the resource for transmitting data from the second resource pool.

In accordance with another aspect of the present disclosure, a base station for transmitting information is provided. The base station includes a transceiver to transmit and receive signals, and at least one processor configured to control to receive information on at least one resource pool from another base station and transmit a handover command message comprising information on a first resource pool and information on a second resource pool based on the information on the at least one resource pool.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
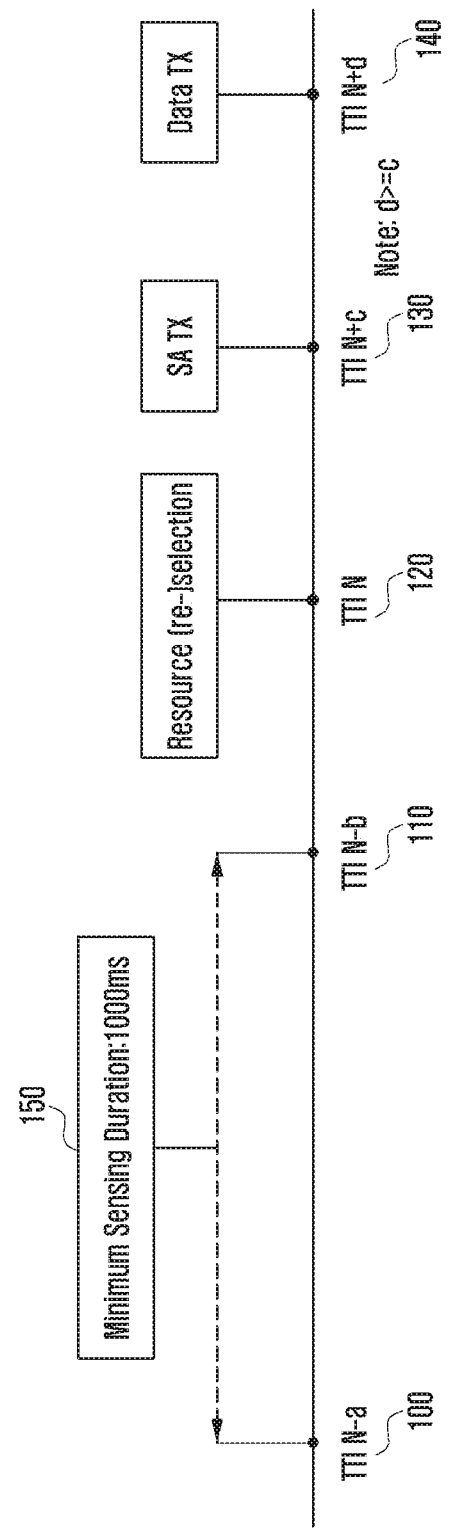
FIG. 1 illustrates the timeline for user equipment (UE) autonomous resource selection for vehicle to vehicle (V2V) communication according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In each drawing, the same or similar components may be denoted by the same reference numerals.

Each block of the flowcharts and combinations of the flowcharts may be performed by computer program instructions. Because these computer program instructions may be mounted in processors for a general computer, a special computer, or other programmable data processing apparatuses, these instructions executed by the processors for the computer or the other programmable data processing apparatuses create means performing functions described in block(s) of the flowcharts. Because these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flowcharts. Because the computer program instructions may also be mounted on the computer or the other programmable data processing apparatuses, the instructions performing a series of operation on the computer or the other programmable data processing apparatuses to create processes executed by the computer to thereby execute the computer or the other programmable data processing apparatuses may also provide operations for performing the functions described in block(s) of the flowcharts.

In addition, each block may indicate a module, a segment, and/or a code including one or more executable instructions for executing a specific logical function(s). Further, functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term "unit" may include software and/or hardware components, such as a field-programmable gate array (FPGA) and/or an application-specific integrated circuit (ASIC). However, the meaning of "unit" is not limited to software and/or hardware. For example, a unit may be configured to be in a storage medium that may be addressed and may also be configured to reproduce one or more processor. Accordingly, a "unit" may include components such as software components, object oriented software components, class components, task components, processors, functions, attributes, procedures, subroutines, segments of program code, drivers, firmware, microcode, circuit, data, database, data structures, tables, arrays, and variables.

Functions provided in the components and the "units" may be combined with a smaller number of components and/or "units" or may further separated into additional components and/or "units".

In addition, components and units may also be implemented to reproduce one or more central processing units (CPUs) within a device or a security multimedia card.

The terms as used in the present disclosure are provided to describe specific embodiments, and do not limit the scope of other embodiments. Unless otherwise defined, the terms and words including technical or scientific terms used in the following description and claims may have the same meanings as generally understood by those skilled in the art. The terms as generally defined in dictionaries may be interpreted as having the same or similar meanings as the contextual meanings of related technology. Unless otherwise defined, the terms should not be interpreted as ideally or excessively formal meanings. When needed, even the terms as defined in the present disclosure may not be interpreted as excluding embodiments of the present disclosure.

Herein, a base station performs resource allocation to a terminal. Examples of the base station may include an eNode B, a Node B, a wireless access unit, a base station controller, a node on a network, etc. Examples of the terminal may include a user equipment (UE), a mobile station (MS), a cellular phone, a smart phone, a computer, a multimedia system performing a communication function, etc.

Herein, a downlink (DL) is a radio transmission path of a signal from a base station to a UE and an uplink (UL) is a radio transmission path of a signal from the UE to the base station.

The various embodiments of the present disclosure may be applied to other communication systems having similar technical backgrounds or channel forms.

Device to Device (D2D) communication enables data communication services between the UE. During the D2D communication (also referred as sidelink (SL) communication) a transmitting UE can transmit data packets to a group of UEs or broadcast data packets to all the UEs or send unicast data packets to a specific UE. UE performs SL communication on subframes defined over the duration of sidelink control (SLC) period. A subframe is a transmit time interval of duration 1 ms. The SLC period is the period over which resources allocated in a cell for SLC information (SLCI) and SL data transmissions occur. Within the SLC period the UE sends SLCI followed by SL data. SLCI indicates destination identifier and characteristics of the transmissions (e.g. modulation and coding scheme (MCS), location of the resource(s) over the duration of SLC period, timing alignment).

The UE supporting SL communication can operate in two modes for resource allocation, scheduled resource allocation and UE autonomous resource selection. In case of scheduled resource allocation, the UE needs to be RRC_CONNECTED in order to transmit data. The UE requests transmission resources from the evolved Node B (eNB). The eNB schedules transmission resources for transmission of SL control information and data. The UE sends a scheduling request (D-SR or Random Access) to the eNB followed by a SL buffer status report (BSR). Based on the SL BSR, the eNB can determine that the UE has data for a SL communication transmission and estimate the resources needed for transmission. ENB can schedule transmission resources for SL communication using configured SL radio network terminal identifier (SL-RNTI).

In case of UE autonomous resource selection, a UE on its own selects resources from resource pools and performs transport format selection to transmit SLCI and data. There can be up to 8 transmission pools. Each pool can have one or more priority associated with it. For transmission of a medium access control (MAC) protocol data unit (PDU), the UE selects a transmission pool in which one of the associated priorities is equal to the priority of a logical channel with highest priority among the logical channel identified in the MAC PDU. There is a one to one association between SLC pool and SL data pool. Once the resource pool is selected, the selection is valid for the entire SLC period. After the SLC period is finished the UE may perform resource pool selection again.

UE interested in D2D communication transmission determines the resource(s) to be used for D2D communication transmission as follows:

UE in radio resource control (RRC) IDLE: eNB can broadcast SL communication transmission (TX) resource pool(s) (i.e. commTxPoolNormalCommon) in system information (SI) (e.g. in SI block). If SI includes SL communication TX resource pool(s), UE in RRC IDLE state autonomously selects the resources from these resource pool(s) for SL communication transmission. If SI does not include SL communication TX resource pool(s), UE in RRC IDLE state transitions to RRC CONNECTED and then requests resources from eNB for SL communication transmission. ENB may provide TX resource pool(s) or dedicated resources.

UE in RRC CONNECTED: If UE is in RRC CONNECTED state then it requests resources from eNB for SL communication transmission. ENB may provide TX resource pool(s) or dedicated resources.

Recently 3rd generation partnership project (3GPP) standard group has initiated work item to enhance the SL communication mechanism for vehicle to vehicle (V2V) or vehicle to everything (V2X) (hereinafter, V2V/V2X) communication. One of the enhancements proposed for efficient transmission is to perform sensing for UE autonomous resource selection. ENB provides TX resource pool. UE autonomously selects the resource(s) from the TX resource pool based on sensing.

FIG. 1 illustrates the timeline for UE autonomous resource selection for V2V/V2X communication according to an embodiment of the present disclosure.

If at TTI 'N' 120 resource selection/reselection is triggered in UE autonomous resource selection mode, the UE at least senses between TTI 'N-a' 100 and TTI 'N-B' 110, where 'a' and 'b' are integers and 'a'=Sensing duration+b ms. The sensing duration is 1000 ms 150. The values 'a' and 'b' are common for V2V/V2X UEs. In UE autonomous resource selection mode, UE transmits scheduling control info (also referred as scheduling assignment (SA)) at TTI 'N+c' 130 indicating the associated data which is transmitted at TTI 'N+d' 140 (d>=c), where 'c' and 'd' are integers.

According to this procedure data transmission can be delayed by '1000+b+c+d' ms. Assuming values of 'b', 'c' and 'd' to be zero the minimum delay is 1000 ms. The key observations for this procedure are: First UE needs to perform sensing for at least 1 s before selecting the resource. Second, data transmission can be delayed by at least 1 s due to sensing.

The above procedure leads to significant delay in data transmission when UE initiates V2V/V2X communication transmission. Besides the initial delay, this procedure also leads to significant interruptions during the ongoing data transmissions, for example when UE transitions from idle to connected state or when TX resource pool is changed in RRC connected state or when UE handovers from one cell to another in RRC connected state. A method to reduce interruptions is needed.

Figure 2:
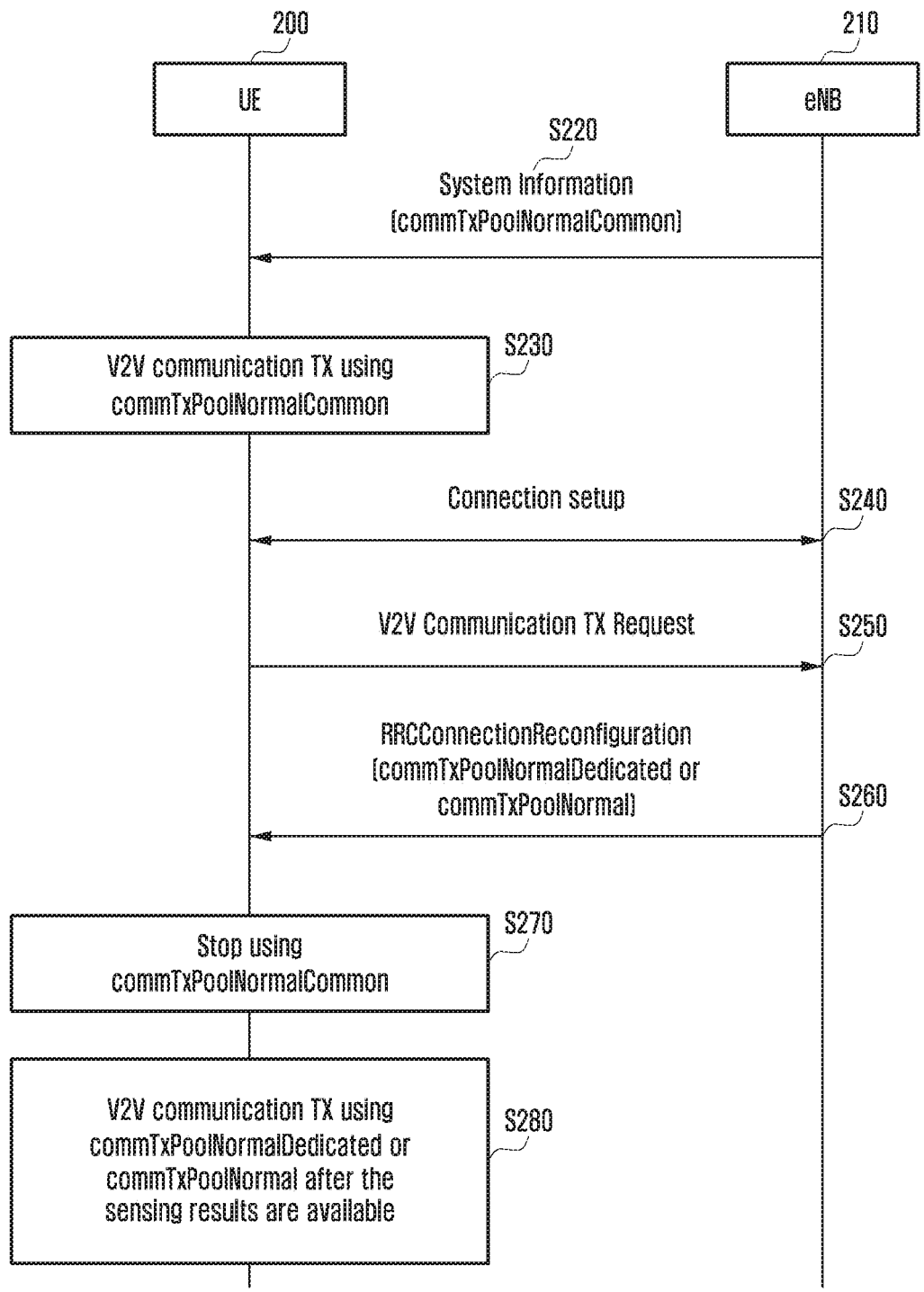
FIG. 2 illustrates the signaling flow according to the scenario 1 according to an embodiment of the present disclosure.

Scenario 1:

FIG. 2 illustrates the signaling flow according to the scenario 1 according to an embodiment of the present disclosure.

UE 200 receives SI including common transmission resource pool i.e. commTxPoolNormalCommon or commTxPoolNormal from eNB 210 at operation S220. UE is in RRC IDLE state and is performing SL V2V/V2X communication transmission using common transmission resource pools i.e. commTxPoolNormalCommon or commTxPoolNormal received in SI at operation S230. The commTxPoolNormal (if included) in SI can be included in entry of inter frequency information list (InterFreqInfoList). The commTxPoolNormalCommon is transmission resource pool for primary cell (Pcell). UE uses commTxPoolNormalCommon for SL V2V/V2X communication transmission if Pcell or Pcell's frequency is used by UE for SL V2V/V2X communication transmission. The commTxPoolNormal is the transmission resource pool of frequency other than Pcell. UE uses commTxPoolNormal in entry of inter frequency information list (InterFreqInfoList) for the frequency in which UE want to transmit SL V2V/V2X communication.

UE transitions from RRC IDLE to RRC CONNECTED state for WAN communication by connection setup at operation S240. In RRC CONNECTED state, UE request resources for SL V2V/V2X communication transmission at operation S250. UE receives Common TX resource pool i.e. commTxPoolNormalDedicated or commTxPoolNormal in dedicated signaling i.e. RRCConnectionReconfiguration message at operation S260. In the RRCConnectionReconfiguration message, the commTxPoolNormal (if included) can be included in entry of inter frequency information list (InterFreqInfoList) for the frequency in which UE want to transmit SL V2V/V2X communication. The commTxPoolNormalDedicated is transmission resource pool for Pcell. UE uses commTxPoolNormalDedicated for SL V2V/V2X communication transmission if Pcell or Pcell's frequency is used by UE for SL V2V/V2X communication transmission. The commTxPoolNormal is the transmission resource pool of frequency other than Pcell. UE uses commTxPoolNormal in entry of inter frequency information list (InterFreqInfoList) for the frequency in which UE want to transmit SL V2V/V2X communication.

UE stops using commTxPoolNormalCommon or commTxPoolNormal received in SI after receiving the RRCConnectionReconfiguration message at operation S270 and starts using commTxPoolNormalDedicated or commTxPoolNormal received in RRCConnectionReconfiguration message for the frequency used by UE for SL V2V/V2X communication transmission at operation S280.

Figure 3:
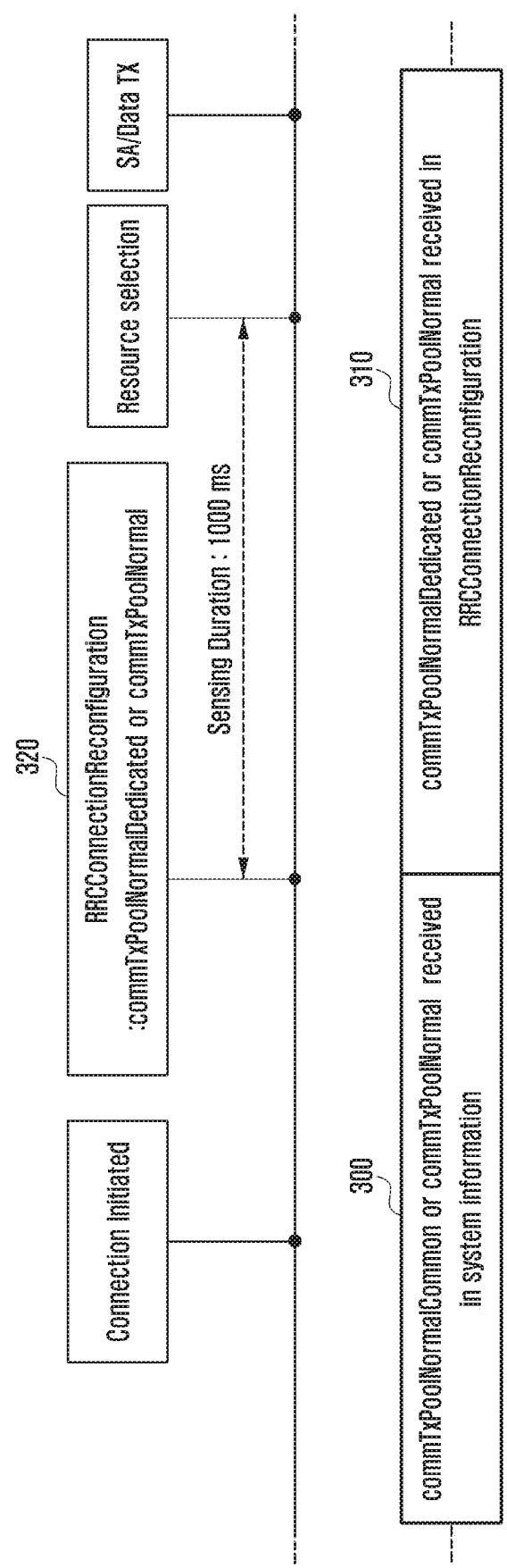
FIG. 3 illustrates an interruption of at least 1 s due to the sensing according to scenario 1 according to an embodiment of the present disclosure.

FIG. 3 illustrates an interruption of at least 1 s due to the sensing according to scenario 1 according to an embodiment of the present disclosure.

In this procedure, there is an interruption of at least 1 s due to sensing. UE has to switch the resource pool when RRCConnectionReconfiguration message 320 is received. After switching the pool from commTxPoolNormalCommon or commTxPoolNormal 300 received in SI commTxPoolNormalDedicated or commTxPoolNormal 310 received in RRCConnectionReconfiguration message, UE has to start sensing resources in commTxPoolNormalDedicated or commTxPoolNormal and sense for at least sensing duration (e.g. 1 s) before selecting the resource, resulting in delay equal to sensing duration.

Figure 4:
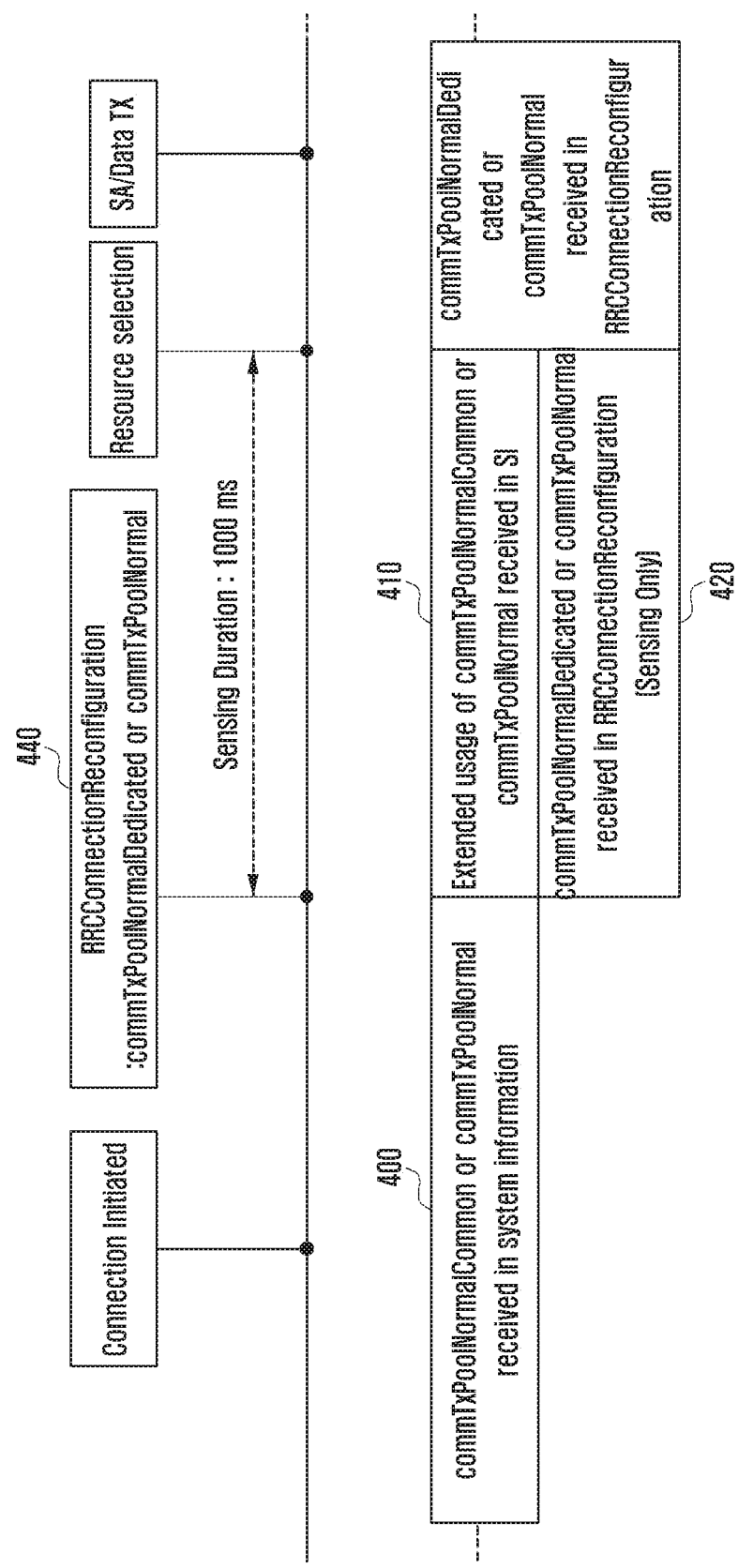
FIG. 4 illustrated the first embodiment for scenario 1 according to an embodiment of the present disclosure.

FIG. 4 illustrated the first embodiment of scenario 1 according to an embodiment of the present disclosure.

In order to reduce this interruption due to sensing, if UE is using commTxPoolNormalCommon or commTxPoolNormal received in SI 400, it continues using the commTxPoolNormalCommon or commTxPoolNormal received in SI 410 even after receiving the commTxPoolNormalDedicated or commTxPoolNormal in dedicated signaling i.e. RRCConnectionReconfiguration message 440. UE continues to use commTxPoolNormalCommon or commTxPoolNormal received in SI 410 while UE is sensing commTxPoolNormalDedicated or commTxPoolNormal received in RRCConnectionReconfiguration 420 after receiving the RRCConnectionReconfiguration including commTxPoolNormalDedicated or commTxPoolNormal. UE stops using commTxPoolNormalCommon or commTxPoolNormal received in SI when initial sensing (for specified time period) is completed for commTxPoolNormalDedicated or commTxPoolNormal received in RRCConnectionReconfiguration. As seen from FIG. 4, there is no interruption as usage of commTxPoolNormalCommon or commTxPoolNormal received in SI is extended until end of initial sensing for commTxPoolNormalDedicated or commTxPoolNormal received in RRCConnectionReconfiguration.

Figure 5:
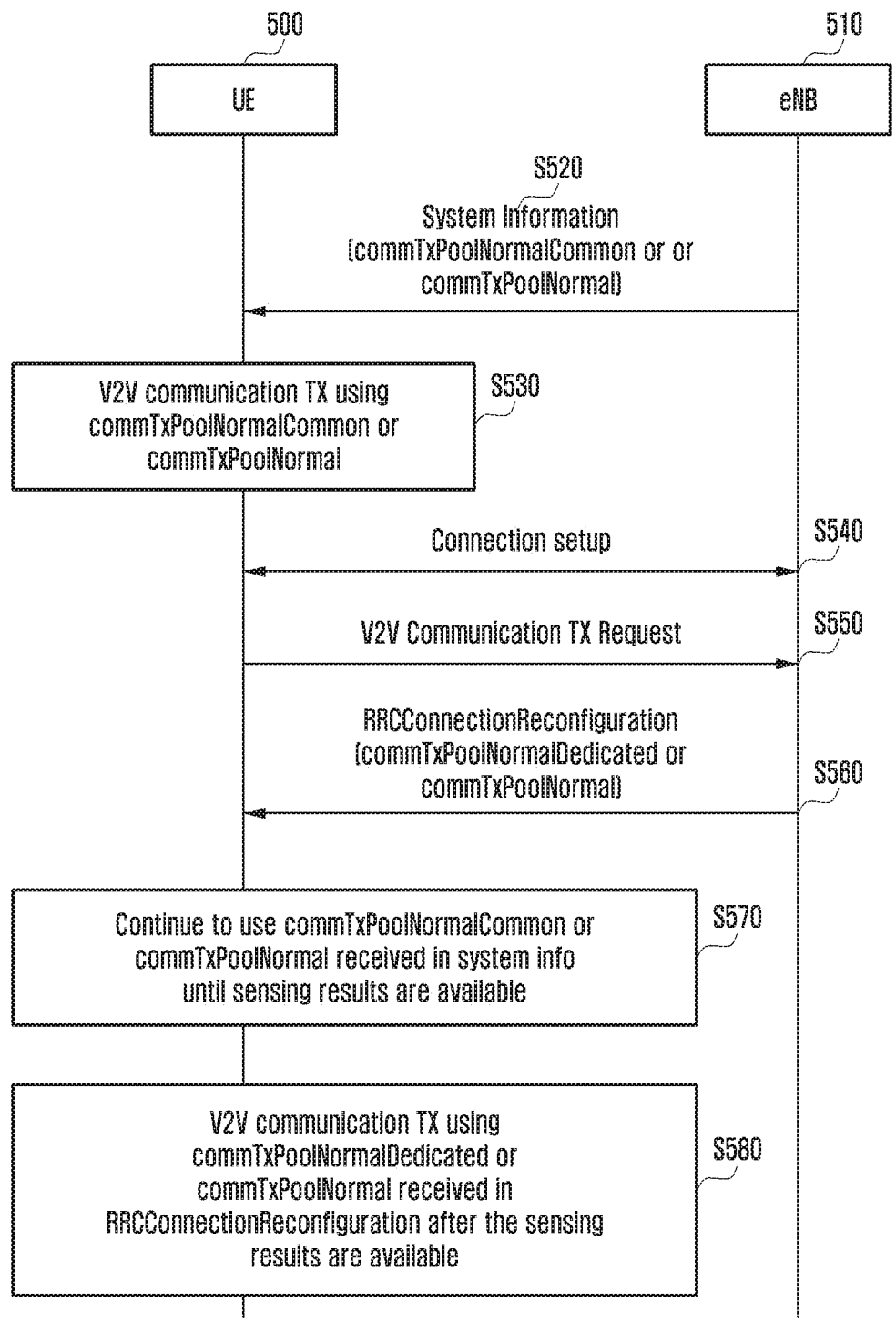
FIG. 5 is a flowchart illustrating the first embodiment of scenario 1 according to an embodiment of the present disclosure.

FIG. 5 is a flowchart illustrating the first embodiment of scenario 1 according to an embodiment of the present disclosure.

UE 500 receives SI including common transmission resource pool i.e. commTxPoolNormalCommon or commTxPoolNormal from eNB 510 at operation S520. UE is in RRC IDLE state and is performing SL V2V/V2X communication transmission using common transmission resource pools i.e. commTxPoolNormalCommon or commTxPoolNormal received in SI at operation S530. UE transitions from RRC IDLE to RRC CONNECTED state for WAN communication by connection setup at operation S540 and requests resources for SL V2V/V2X communication transmission at operation S550. UE receives Common TX resource pool i.e. commTxPoolNormalDedicated or commTxPoolNormal in dedicated signaling i.e. RRCConnectionReconfiguration message at operation S560 and continues to use commTxPoolNormalCommon or commTxPoolNormal received in SI until sensing results are available at operation S570. After the sensing results are available, UE performs SL V2V/V2X communication transmission using commTxPoolNormalDedicated or commTxPoolNormal received in dedicated signaling i.e. RRCConnectionReconfiguration message at operation S580.

Figure 6:
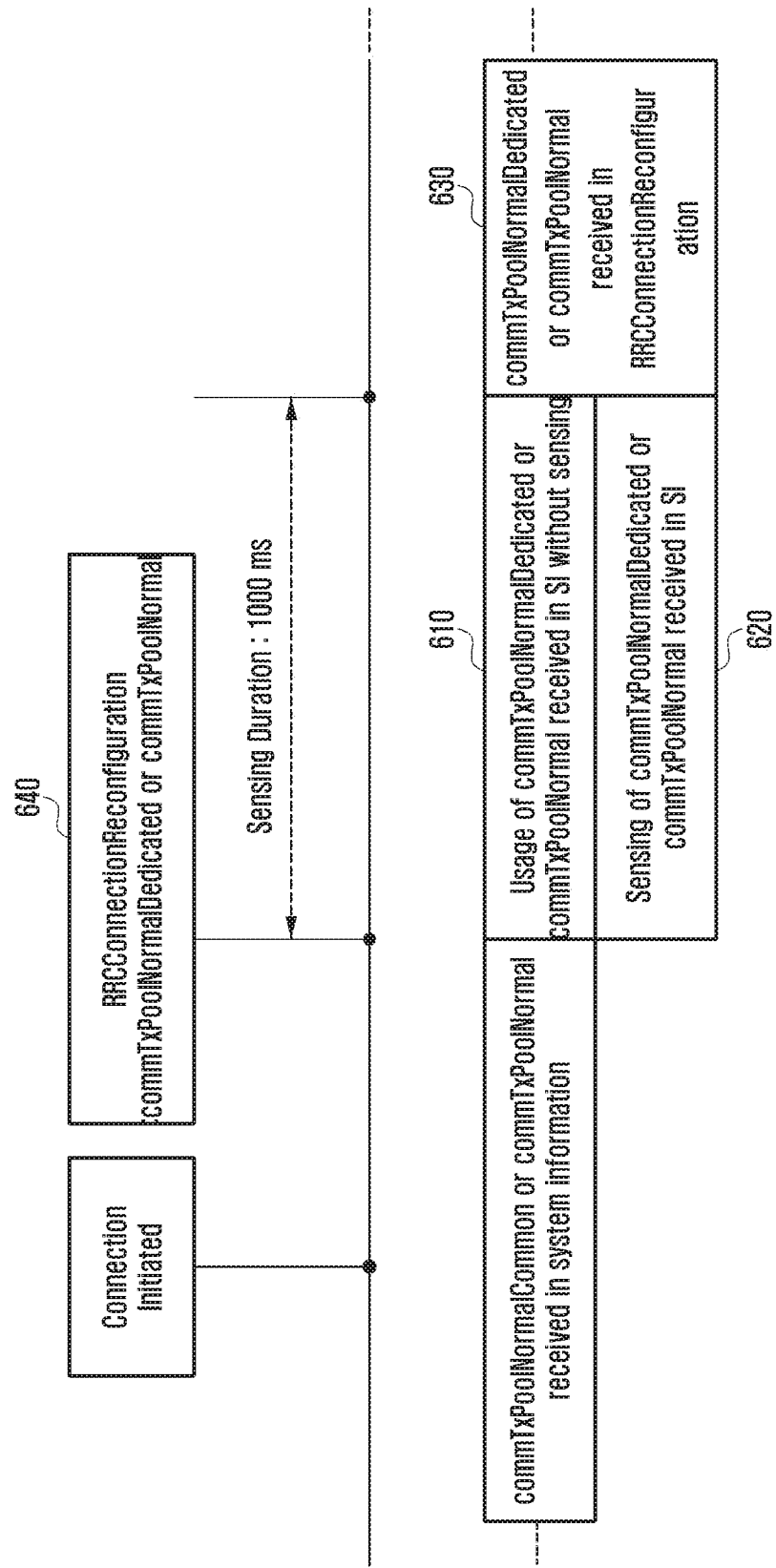
FIG. 6 illustrated the second embodiment of scenario 1 according to an embodiment of the present disclosure.

FIG. 6 illustrated the second embodiment of scenario 1 according to an embodiment of the present disclosure.

In order to reduce this interruption due to sensing, after receiving the commTxPoolNormalDedicated or commTxPoolNormal in dedicated signaling i.e. RRCConnectionReconfiguration message 640, UE can use the commTxPoolNormalDedicated or commTxPoolNormal received in RRCConnectionReconfiguration 610 after receiving the RRCConnectionReconfiguration without sensing while it is performing initial sensing (for specified time period) on commTxPoolNormalDedicated or commTxPoolNormal 620. As seen from FIG. 6, there is no interruption as usage of commTxPoolNormalDedicated or commTxPoolNormal received in RRCConnectionReconfiguration is allowed without sensing until end of initial sensing for commTxPoolNormalDedicated or commTxPoolNormal received in RRCConnectionReconfiguration. After sensing, UE uses the commTxPoolNormalDedicated or commTxPoolNormal received in RRCConnectionReconfiguration based on sensing results 630.

Figure 7:
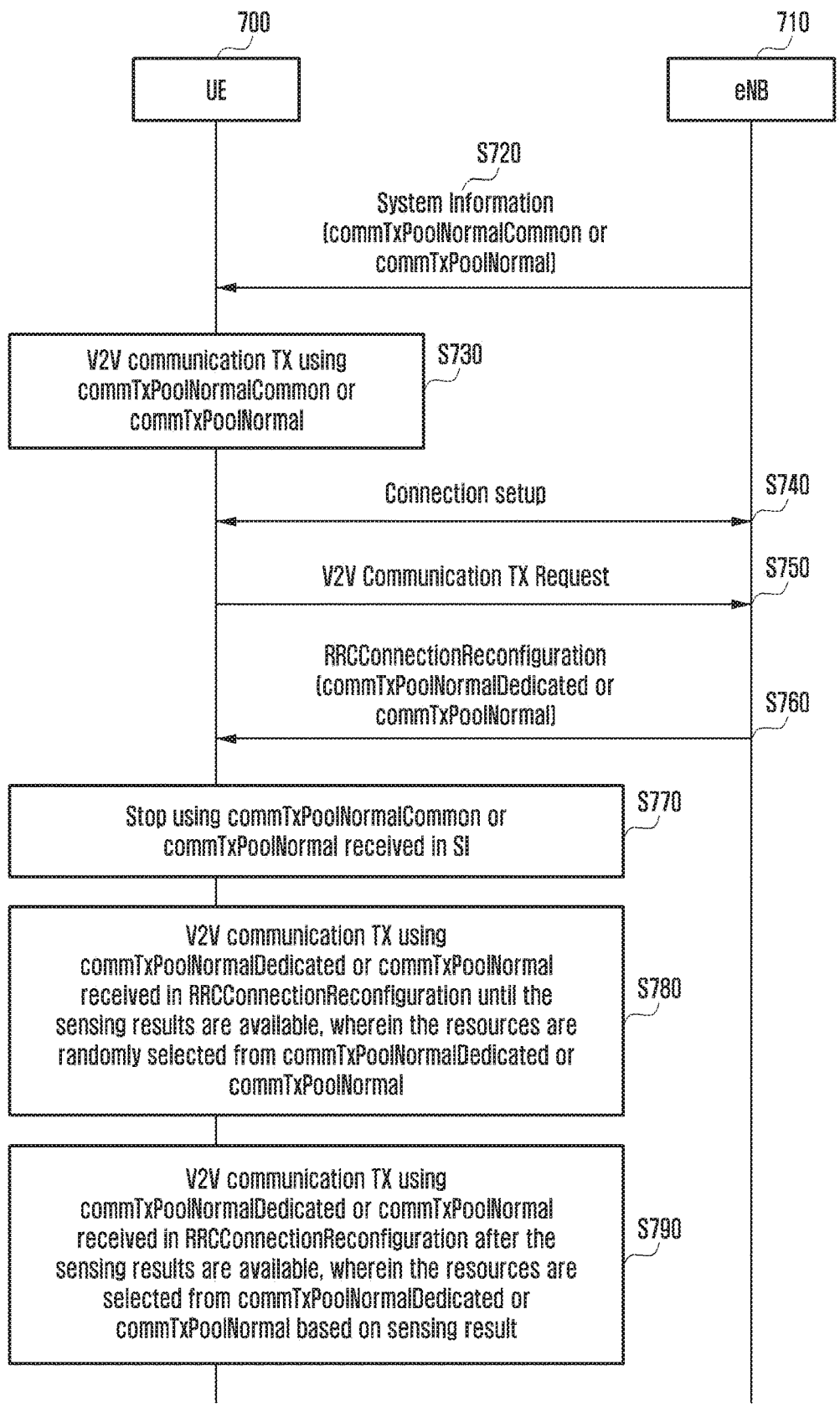
FIG. 7 is a flowchart illustrating the second embodiment of scenario 1 according to an embodiment of the present disclosure.

FIG. 7 is a flowchart illustrating the second embodiment of scenario 1 according to an embodiment of the present disclosure.

UE 700 receives SI including common transmission resource pool i.e. commTxPoolNormalCommon or commTxPoolNormal from eNB 710 at operation S720. UE is in RRC IDLE state and is performing SL V2V/V2X communication transmission using common transmission resource pools i.e. commTxPoolNormalCommon or commTxPoolNormal received in SI at operation S730. UE transitions from RRC IDLE to RRC CONNECTED state for WAN communication by connection setup at operation S740. In RRC CONNECTED state, UE request resources for SL V2V/V2X communication transmission at operation S750. UE receives Common TX resource pool i.e. commTxPoolNormalDedicated or commTxPoolNormal in dedicated signaling i.e. RRCConnectionReconfiguration message at operation S760. After receiving RRCConnectionReconfiguration message, UE stops using commTxPoolNormalCommon or commTxPoolNormal at operation S770 received in SI and starts using commTxPoolNormalDedicated or commTxPoolNormal received in dedicated signaling until the sensing results are available at operation S780. The resources are randomly selected from commTxPoolNormalDedicated or commTxPoolNormal received in dedicated signaling. After the sensing results are available, UE uses commTxPoolNormalDedicated or commTxPoolNormal received in dedicated signaling to perform SL V2V/V2X communication at operation S790. The resources are selected from commTxPoolNormalDedicated or commTxPoolNormal based on the sensing results.

Figure 8:
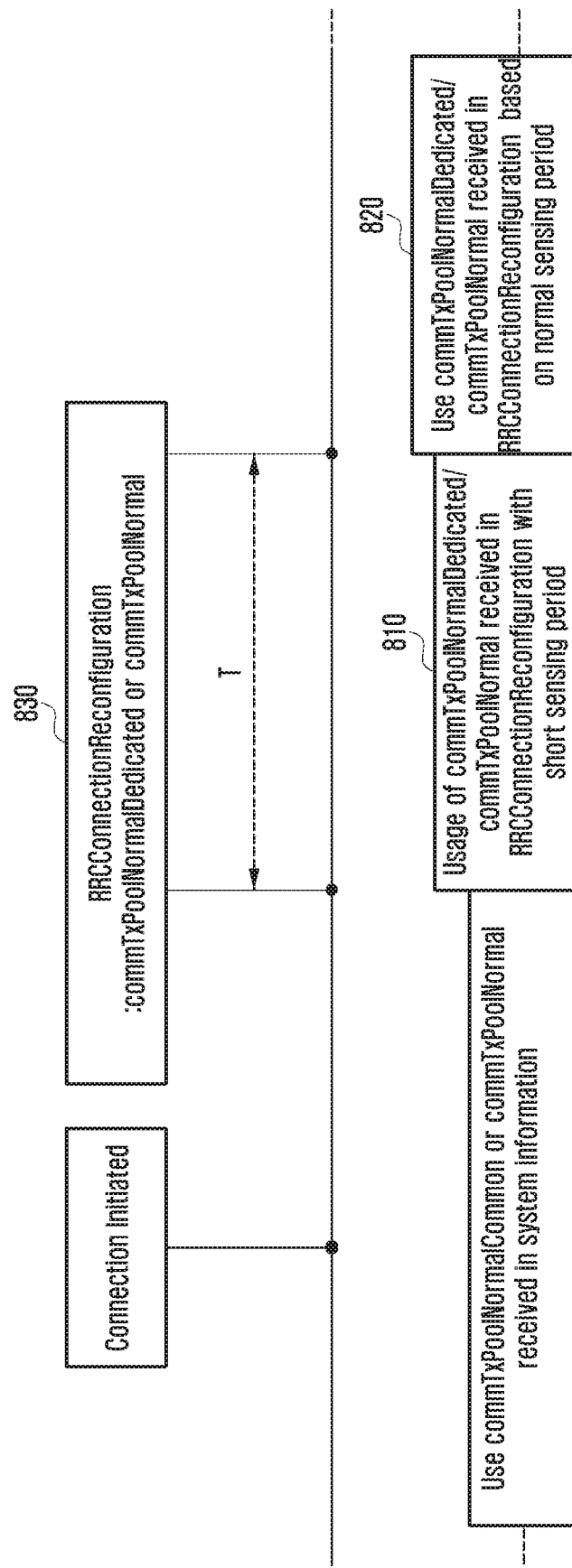
FIG. 8 illustrates the third embodiment of scenario 1 according to an embodiment of the present disclosure.

FIG. 8 illustrates the third embodiment of scenario 1 according to an embodiment of the present disclosure.

In order to reduce this interruption due to sensing, after receiving the commTxPoolNormalDedicated or commTxPoolNormal in dedicated signaling i.e. RRCConnectionReconfiguration message 830, UE performs sensing of the commTxPoolNormalDedicated or commTxPoolNormal received in RRCConnectionReconfiguration in short duration (e.g. 250 ms) for a defied time period T 810. T>=duration for normal sensing i.e. 1000 ms. UE can use the commTxPoolNormalDedicated or commTxPoolNormal received in RRCConnectionReconfiguration after short sensing duration 820.

Figure 9:
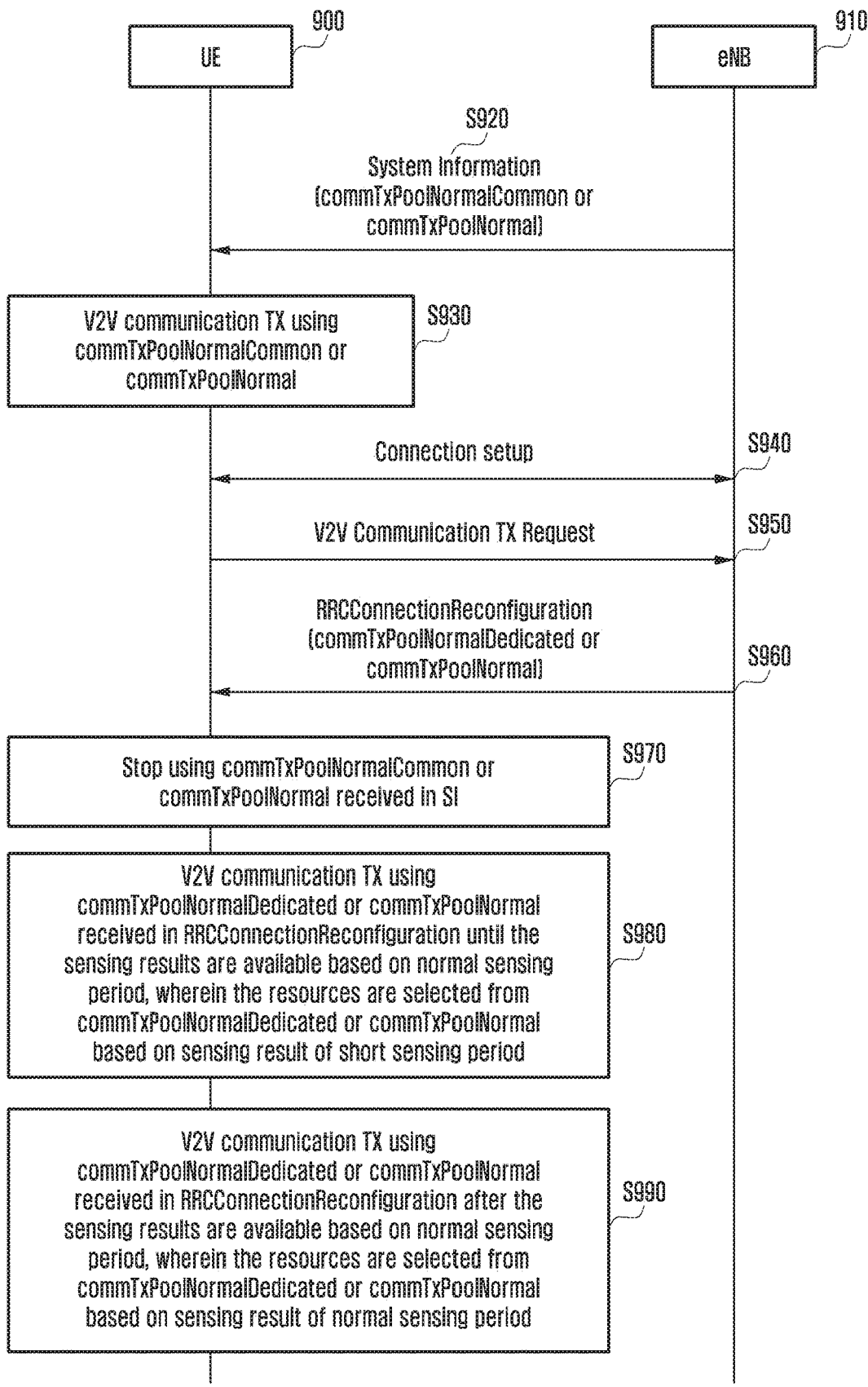
FIG. 9 is a flowchart illustrating the third embodiment of scenario 1 according to an embodiment of the present disclosure.

FIG. 9 is a flowchart illustrating the third embodiment scenario 1 according to an embodiment of the present disclosure.

UE 900 receives SI including common transmission resource pool i.e. commTxPoolNormalCommon or commTxPoolNormal from eNB 910 at operation S920. UE is in RRC IDLE state and is performing SL V2V/V2X communication transmission using common transmission resource pools i.e. commTxPoolNormalCommon or commTxPoolNormal received in SI at operation S930. UE transitions from RRC IDLE to RRC CONNECTED state for WAN communication by connection setup at operation S940. In RRC CONNECTED state, UE request resources for SL V2V/V2X communication transmission at operation S950. UE receives Common TX resource pool i.e. commTxPoolNormalDedicated or commTxPoolNormal in dedicated signaling i.e. RRCConnectionReconfiguration message at operation S960. After receiving RRCConnectionReconfiguration message, UE stops using commTxPoolNormalCommon or commTxPoolNormal at operation S970 received in SI. UE performs short duration sensing of commTxPoolNormalDedicated or commTxPoolNormal received in RRCConnectionReconfiguration message. When short sensing period expires, UE starts using commTxPoolNormalDedicated or commTxPoolNormal based on short sensing results until the sensing results of normal sensing are available at operation S980. After the sensing results of normal sensing are available, UE uses commTxPoolNormalDedicated or commTxPoolNormal based on the sensing results of normal sensing at operation S990.

Figure 10:
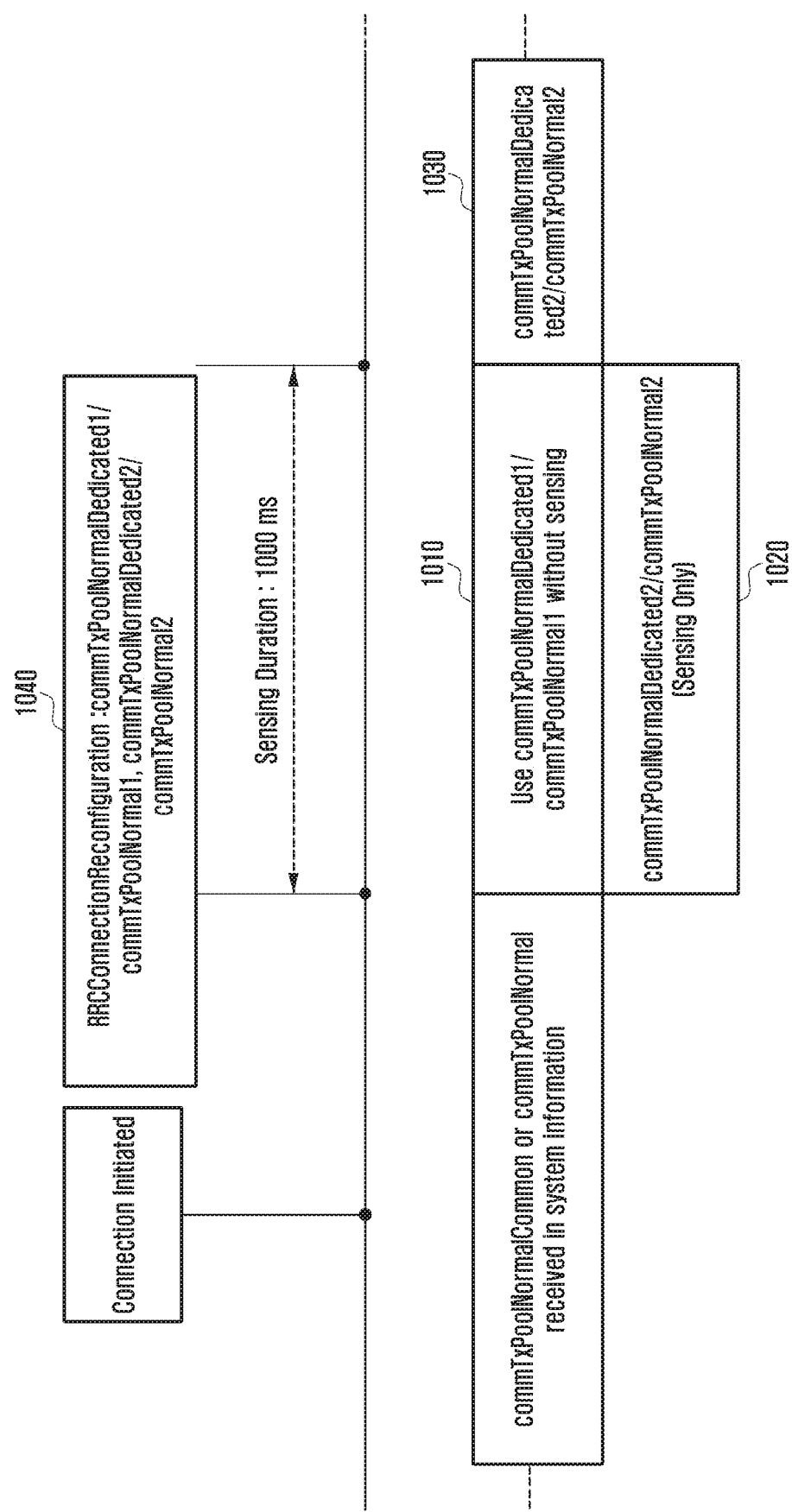
FIG. 10 illustrates the fourth embodiment of scenario 1 according to an embodiment of the present disclosure.

FIG. 10 illustrates the fourth embodiment of scenario 1 according to an embodiment of the present disclosure.

In order to reduce this interruption due to sensing, eNB can signal two sets of TX resource pool(s), commTxPoolNormalDedicated1 or commTxPoolNormal1 and commTxPoolNormalDedicated2 or commTxPoolNormal2 in dedicated signaling i.e. RRCConnectionReconfiguration message. After receiving the RRCConnectionReconfiguration UE starts sensing for commTxPoolNormalDedicated2 or commTxPoolNormal2 1020 and uses commTxPoolNormalDedicated1 or commTxPoolNormal1 1010 while UE is sensing commTxPoolNormalDedicated2 or commTxPoolNormal2. UE stops using commTxPoolNormalCommon or commTxPoolNormal received in SI 1000 after receiving RRCConnectionReconfiguration message 1040. UE stops using commTxPoolNormalDedicated1 or commTxPoolNormal1 received in RRCConnectionReconfiguration after initial sensing (for specified time period) is done for commTxPoolNormalDedicated2 or commTxPoolNormal2 and starts using commTxPoolNormalDedicated2 or commTxPoolNormal2 1030 based on sensing results.

Figure 11:
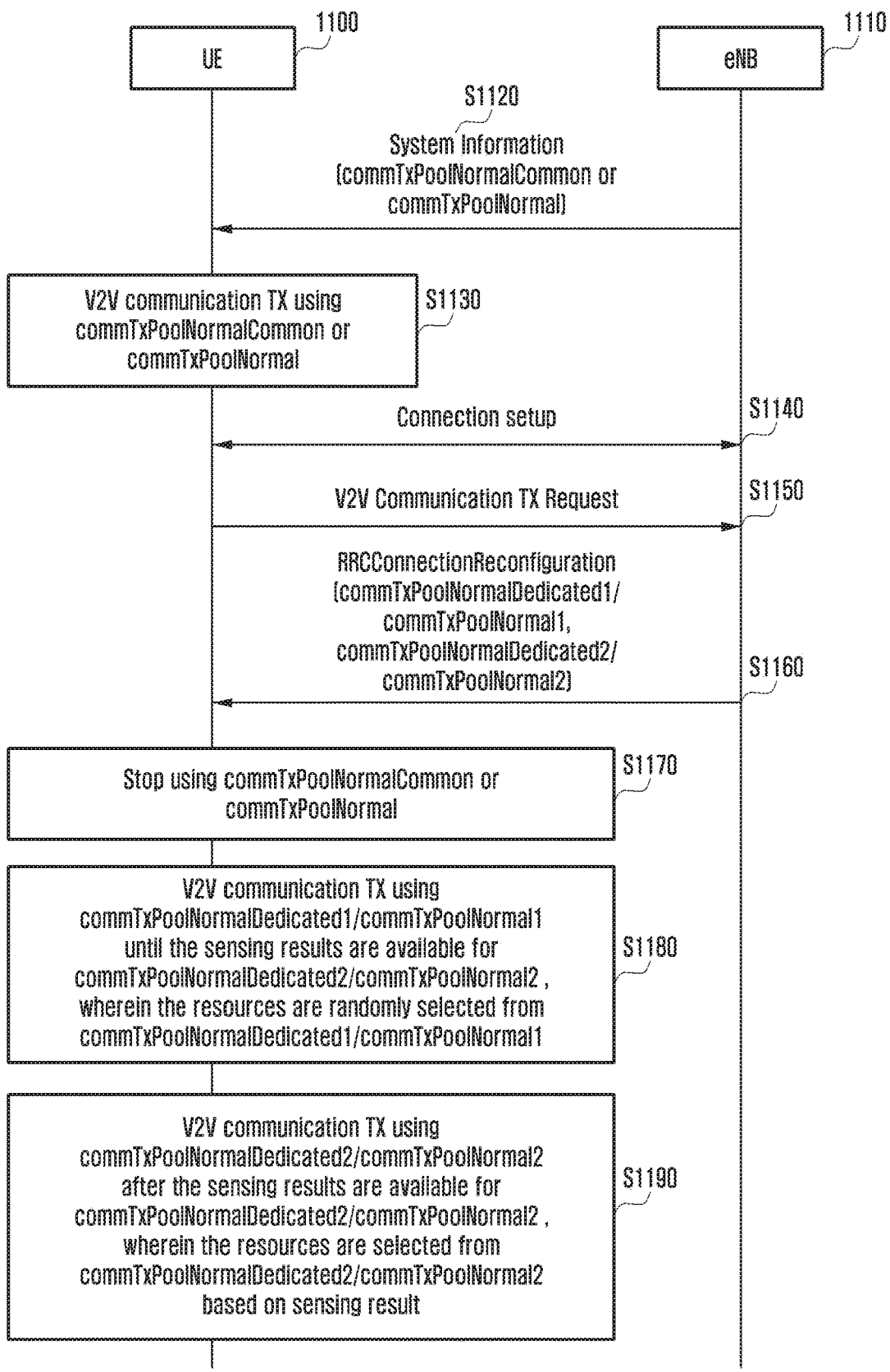
FIG. 11 is a flowchart illustrating the fourth embodiment of scenario 1 according to an embodiment of the present disclosure.

FIG. 11 is a flowchart illustrating the fourth embodiment of scenario 1 according to an embodiment of the present disclosure.

UE 1100 receives SI including common transmission resource pool i.e. commTxPoolNormalCommon or commTxPoolNormal from eNB 1110 at operation S1120. UE is in RRC IDLE state and is performing SL V2V/V2X communication transmission using common transmission resource pools i.e. commTxPoolNormalCommon or commTxPoolNormal received in SI at operation S1130. UE transitions from RRC IDLE to RRC CONNECTED state for WAN communication by connection setup at operation S1140. In RRC CONNECTED state, UE request resources for SL V2V/V2X communication transmission at operation S1150. UE receives Common TX resource pool i.e. commTxPoolNormalDedicated1, commTxPoolNormalDedicated2 or commTxPoolNormal1, commTxPoolNormal2 in dedicated signaling i.e. RRCConnectionReconfiguration message at operation S1160. After receiving RRCConnectionReconfiguration message, UE stops using commTxPoolNormalCommon or commTxPoolNormal at operation S1170 and starts using commTxPoolNormalDedicated1 or commTxPoolNormal1 until the sensing results for commTxPoolNormalDedicated2 or commTxPoolNormal2 are available at operation S1180. The resources are randomly selected from commTxPoolNormalDedicated1 or commTxPoolNormal1. After the sensing results for commTxPoolNormalDedicated2 or commTxPoolNormal2 are available, UE starts to perform SL V2V/V2X communication using commTxPoolNormalDedicated2 or commTxPoolNormal2 based on the sensing result at operation S1190. The resources are selected from commTxPoolNormalDedicated2 or commTxPoolNormal2 based on sensing result.

Figure 12:
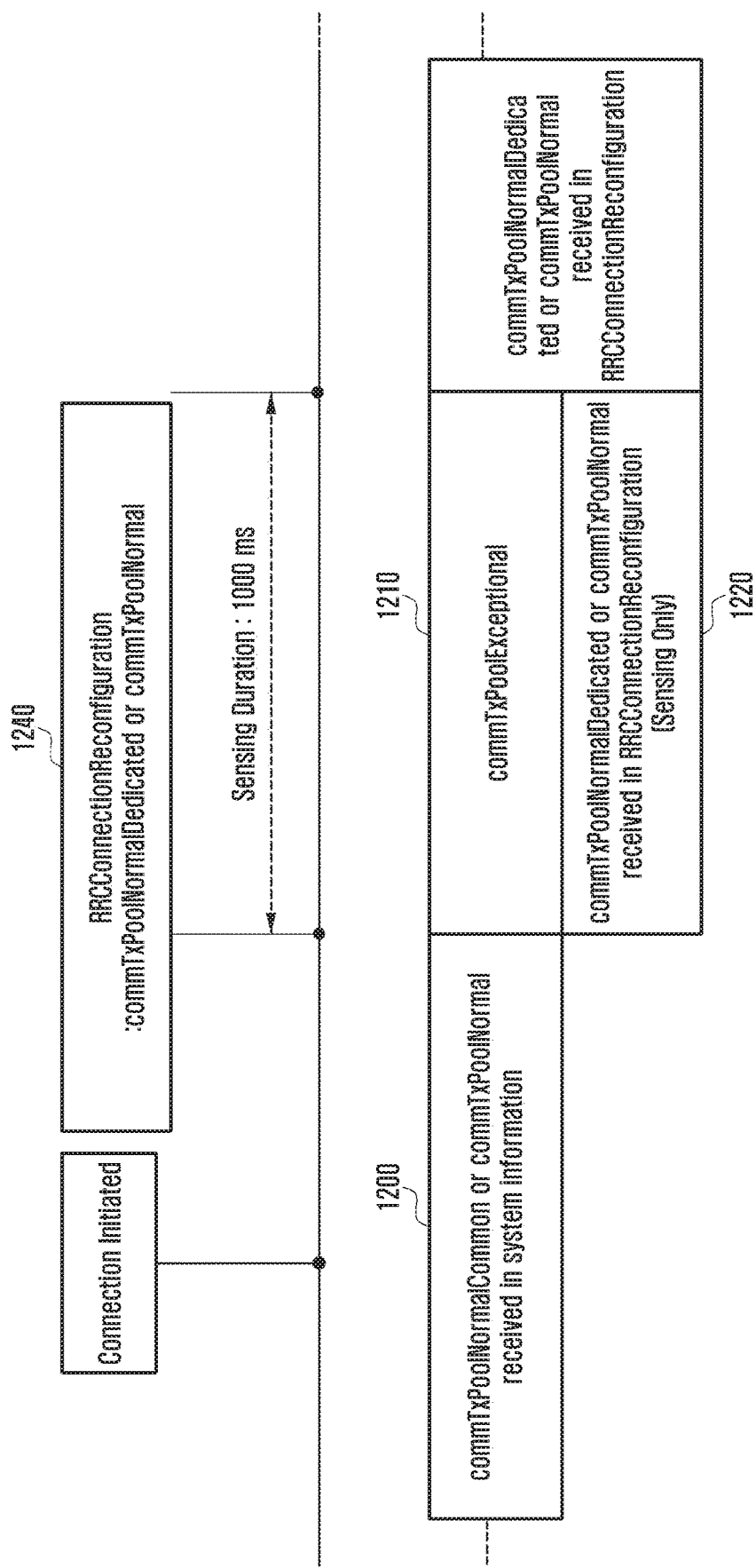
FIG. 12 illustrates the fifth embodiment of scenario 1 according to an embodiment of the present disclosure.

FIG. 12 illustrates the fifth embodiment of scenario 1 according to an embodiment of the present disclosure.

In order to reduce this interruption due to sensing, eNB can signal transmission resource pool configurations for autonomous resource selection i.e. commTxPoolNormalDedicated or commTxPoolNormal in dedicated signaling (RRCConnectionReconfiguration message) and exceptional transmission resource pool i.e. commTxPoolExceptional in broadcast signaling SI. The commTxPoolExceptional can also be included in dedicated signaling (RRCConnectionReconfiguration message). In the RRCConnectionReconfiguration message, the commTxPoolNormal (if included) can be included in entry of inter frequency information list (InterFreqInfoList) for the frequency in which UE want to transmit SL V2V/V2X communication. In the SI, the commTxPoolExceptional (if included) for non-serving frequency can be included in entry of inter frequency information list (InterFreqInfoList) for the frequency in which UE want to transmit SL V2V/V2X communication. In the SI, the commTxPoolExceptional (if included) for serving frequency (i.e. frequency of Pcell) can be included as part of common configuration. In the RRCConnectionReconfiguration message, the commTxPoolExceptional (if included) can be included in entry of inter frequency information list (InterFreqInfoList) for the frequency in which UE want to transmit SL V2V/V2X communication. After receiving the RRCConnectionReconfiguration message including transmission resource pool configurations for autonomous resource selection i.e. commTxPoolNormalDedicated or commTxPoolNormal 1240, UE uses commTxPoolExceptional (if signaled either in broadcast or dedicated signaling for the concerned frequency) without sensing (i.e. randomly select resources from the resource pool) while UE is performing sensing on the resources included in commTxPoolNormalDedicated 1210. UE stops using commTxPoolNormalCommon after receiving RRCConnectionReconfiguration message 1200. UE stops using commTxPoolExceptional after initial sensing is completed on the resources included in commTxPoolNormalDedicated or commTxPoolNormal 1220. No sensing is performed for usage (or selecting resources) of commTxPoolExceptional. Alternately sensing can be performed for commTxPoolExceptional while UE is using commTxPoolNormalCommon. Alternately sensing can be started for commTxPoolExceptionalCommon after the connection is initiated. Sensing period for commTxPoolExceptional can be smaller (pre-defined or signaled) than normal sensing duration.

Figure 13:
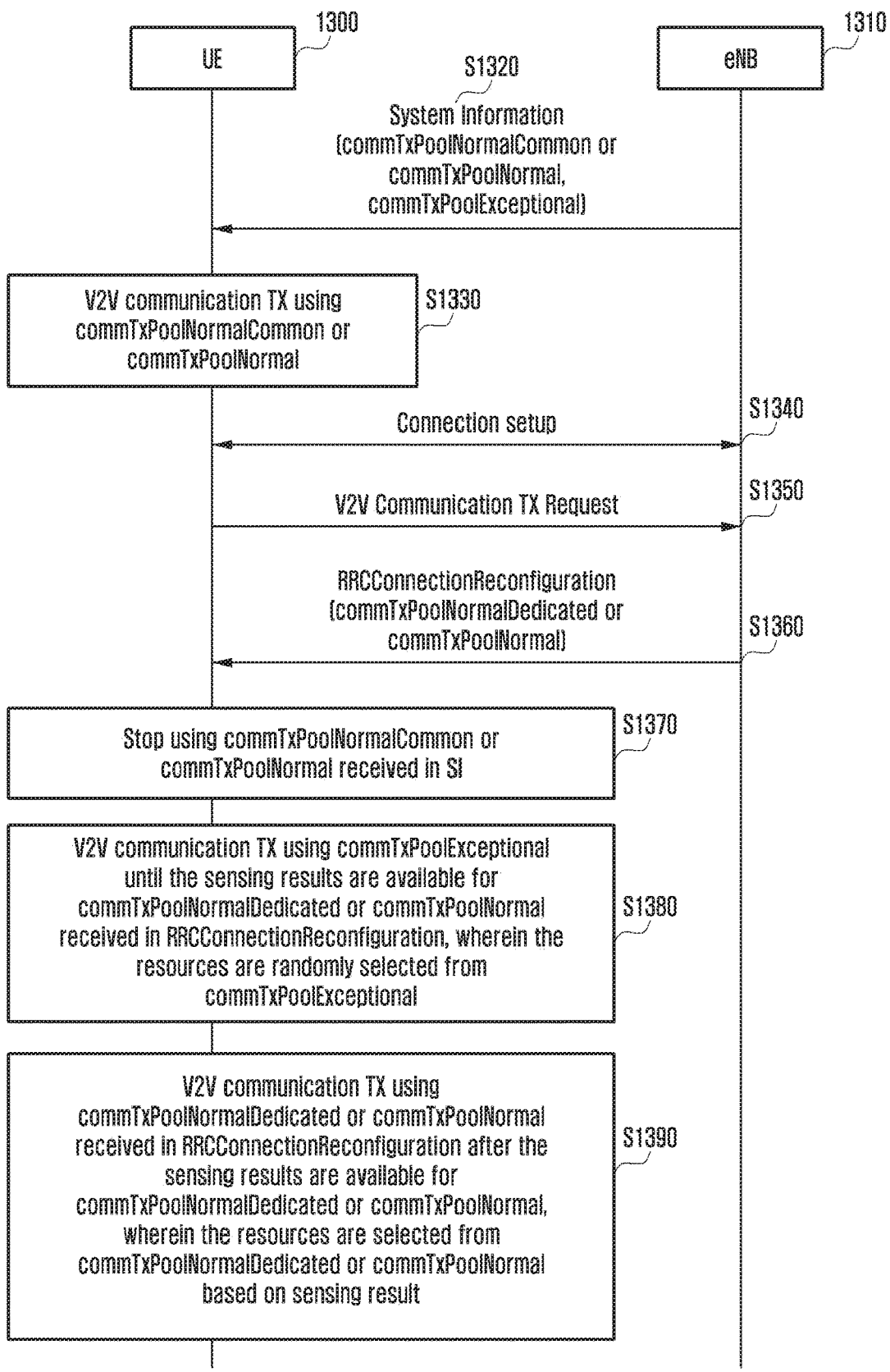
FIG. 13 is a flowchart illustrating the fifth embodiment of scenario 1 according to an embodiment of the present disclosure.

FIG. 13 is a flowchart illustrating the fifth embodiment of scenario 1 according to an embodiment of the present disclosure.

UE 1300 receives SI including common transmission resource pool i.e. commTxPoolNormalCommon or commTxPoolNormal from eNB 1310 at operation S1320. UE is in RRC IDLE state and is performing SL V2V/V2X communication transmission using common transmission resource pools i.e. commTxPoolNormalCommon or commTxPoolNormal received in SI at operation S1330. UE transitions from RRC IDLE to RRC CONNECTED state for WAN communication by connection setup at operation S1340. In RRC CONNECTED state, UE request resources for SL V2V/V2X communication transmission at operation S1350. UE receives Common TX resource pool i.e. commTxPoolNormalDedicated or commTxPoolNormal in dedicated signaling i.e. RRCConnectionReconfiguration message at operation S1360. After receiving RRCConnectionReconfiguration message, UE stops using commTxPoolNormalCommon or commTxPoolNormal at operation S1370. UE starts using commTxPoolExceptional without sensing until the sensing results are available for commTxPoolNormalDedicated or commTxPoolNormal at operation S1380. The resources are randomly selected from commTxPoolExceptional. After the sensing results are available, UE performs SL V2V/V2X communication transmission using commTxPoolNormalDedicated or commTxPoolNormal at operation S1390. The resources are selected based on the sensing results.

In an alternate embodiment of the present disclosure, in response to SL communication request eNB may signal (e.g. using one bit indication) in RRCConnectionReconfiguration message to use the commTxPoolNormalCommon which is broadcasted in SIB instead of signaling commTxPoolNormalDedicated. As a result, UE does not have to switch from commTxPoolNormalCommon commTxPoolNormalDedicated and hence no interruption.

In an alternate embodiment of the present disclosure, eNB may indicate (e.g. one bit indicator) in broadcast signaling that UE can continue to use commTxPoolNormalCommon which is broadcasted in SIB in RRC connected state. UE does not need to request for resources in RRC connected state or when UE transitions from RRC Idle to RRC Connected. As a result, UE does not request new resources and does not have to switch from commTxPoolNormalCommon commTxPoolNormalDedicated and hence no interruption.

In an alternate embodiment of the present disclosure, eNB may signal commTxPoolNormalDedicated and also signal (e.g. using one bit indication) that commTxPoolNormalDedicated is same as commTxPoolNormalCommon or is a subset of commTxPoolNormalCommon in RRCConnectionReconfiguration message. As a result, UE does not have to initiate sensing again as UE is already performing sensing.

Scenario 2:

UE is in RRC IDLE. Common TX resource pools i.e. commTxPoolNormalCommon is not broadcasted in SI. UE transitions from RRC IDLE to RRC CONNECTED to request resources for SL V2V/V2X communication transmission. UE performs sidelink communication transmission using commTxPoolExceptional received in SI after initiating the connection. In the SI, the commTxPoolExceptional (if included) for non-serving frequency can be included in entry of inter frequency information list (InterFreqInfoList) for the frequency in which UE want to transmit sidelink V2V/V2X communication. In the SI, the commTxPoolExceptional (if included) for serving frequency (i.e. frequency of Pcell) can be included as part of common configuration.

UE receives Common TX resource pools i.e. commTxPoolNormalDedicated or commTxPoolNormal in dedicated signaling i.e. RRCConnectionReconfiguration message. UE stops using commTxPoolExceptional and starts using commTxPoolNormalDedicated or commTxPoolNormal. In the RRCConnectionReconfiguration message, the commTxPoolNormal (if included) can be included in entry of inter frequency information list (InterFreqInfoList) for the frequency in which UE want to transmit SL V2V/V2X communication. The commTxPoolNormalDedicated is transmission resource pool for Pcell. UE uses commTxPoolNormalDedicated for SL V2V/V2X communication transmission if Pcell or Pcell's frequency is used by UE for SL V2V/V2X communication transmission. The commTxPoolNormal is the transmission resource pool of frequency other than Pcell. UE uses commTxPoolNormal in entry of inter frequency information list (InterFreqInfoList) for the frequency in which UE want to transmit SL V2V/V2X communication.

Figure 14:
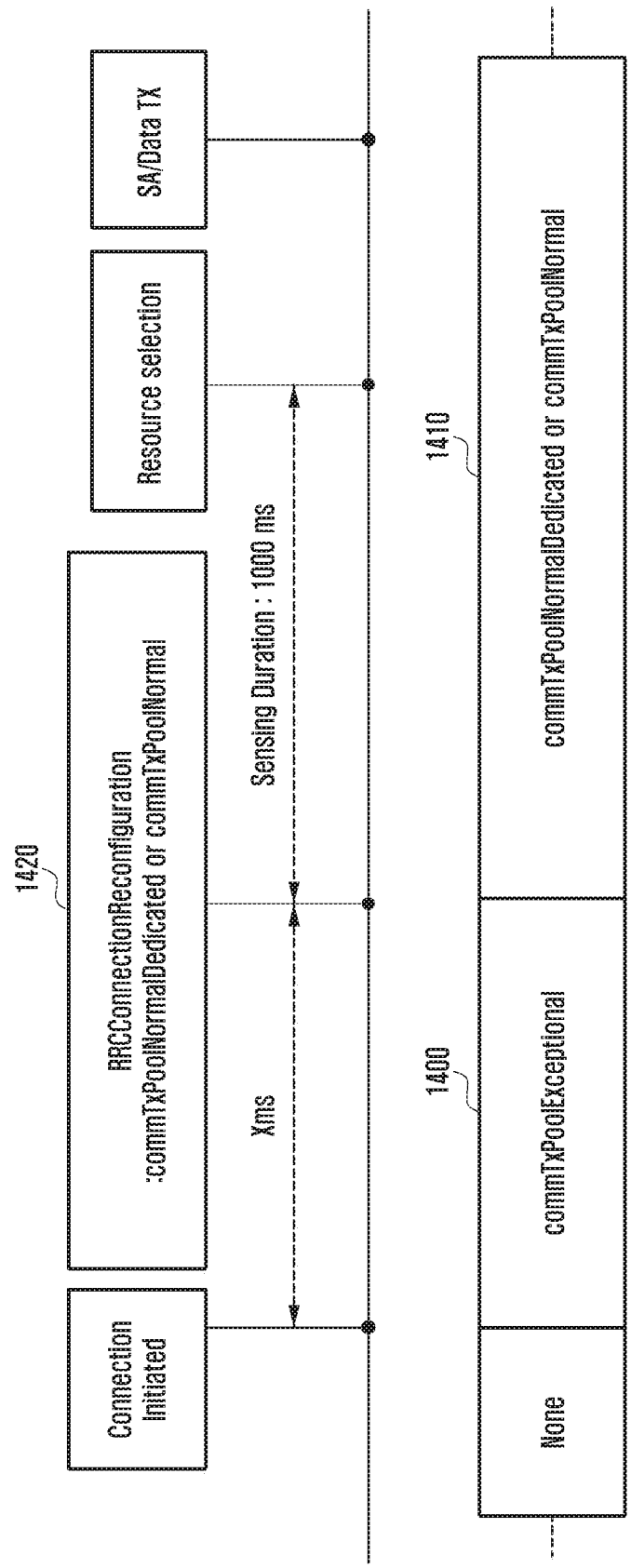
FIG. 14 illustrates an interruption of at least 1 s due to the sensing according to scenario 2 according to an embodiment of the present disclosure.

FIG. 14 illustrates an interruption of at least 1 s due to the sensing according to scenario 2 according to an embodiment of the present disclosure.

In this procedure, there is an interruption of at least 1 s due to sensing. After switching the pool from commTxPoolExceptional 1400 commTxPoolNormalDedicated or commTxPoolNormal 1410, UE has to start sensing for commTxPoolNormalDedicated or commTxPoolNormal resulting in delay of at least 1 s.

If the time X between connection initiation and reception of commTxPoolNormalDedicated or commTxPoolNormal in RRCConnectionReconfiguration is smaller than '1000+ b+c+d' ms and UE switches from commTxPoolExceptional to commTxPoolNormalDedicated or commTxPoolNormal after receiving commTxPoolNormalDedicated in RRCConnectionReconfiguration 1420 then there is no benefit of usage of exceptional pool. There will be delay of at least 1000+X ms in SL communication transmission.

Figure 15:
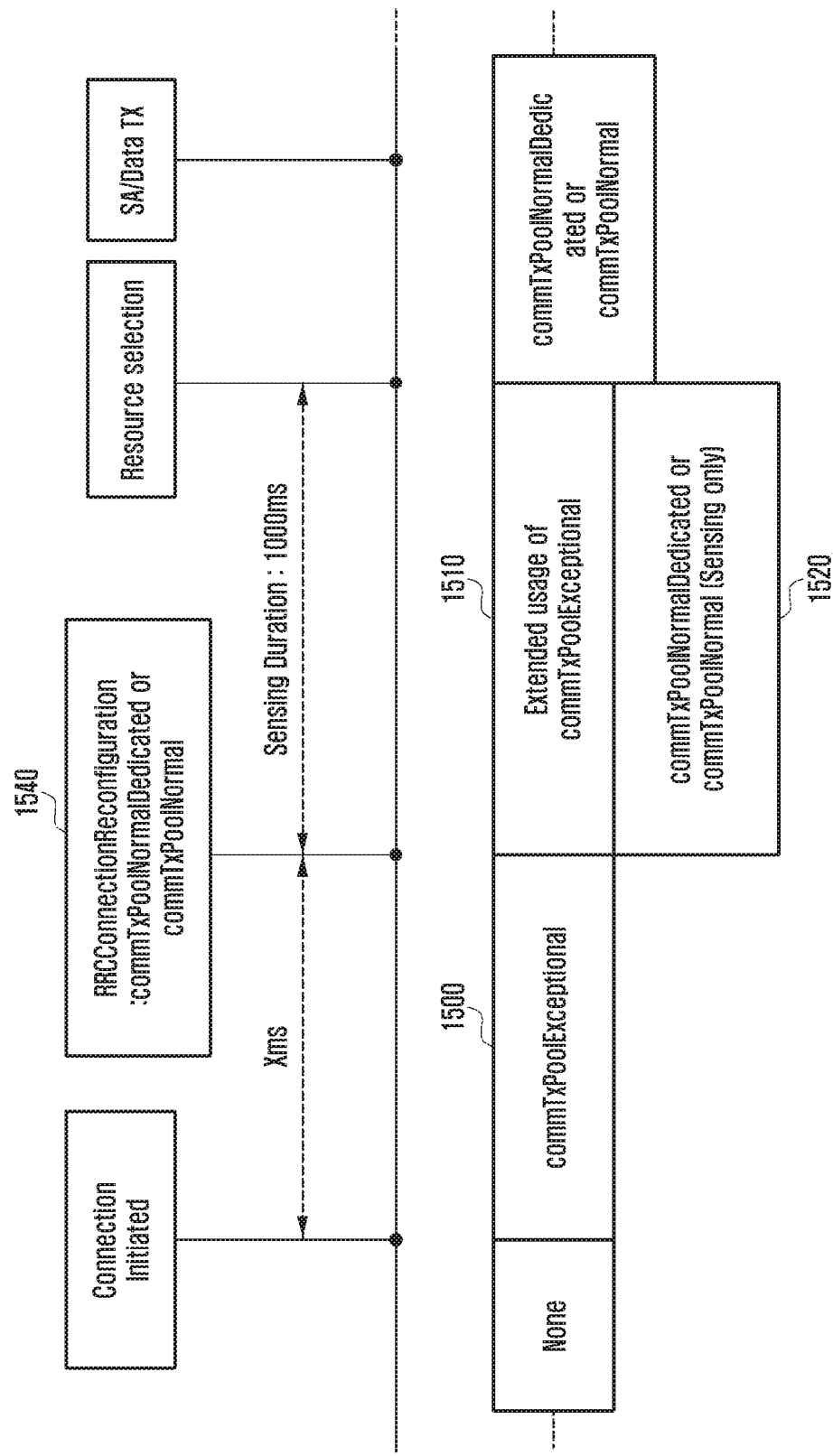
FIG. 15 illustrated the first embodiment of scenario 2 according to an embodiment of the present disclosure.

FIG. 15 illustrated the first embodiment of scenario 2 according to an embodiment of the present disclosure.

In order to reduce this interruption due to sensing, if UE is using commTxPoolExceptional 1500, it continues using the commTxPoolExceptional 1510 even after receiving the commTxPoolNormalDedicated or commTxPoolNormal in dedicated signaling i.e. RRCConnectionReconfiguration message. UE continues to use commTxPoolExceptional while UE is sensing commTxPoolNormalDedicated or commTxPoolNormal 1520 after receiving the RRCConnectionReconfiguration including commTxPoolNormalDedicated or commTxPoolNormal 1540. UE stops using commTxPoolExceptional when initial sensing (for specified period) is completed for commTxPoolNormalDedicated or commTxPoolNormal. As seen from FIG. 15, there is no interruption after receiving RRCConnectionReconfiguration as usage of commTxPoolExceptional is extended until end of initial sensing for commTxPoolNormalDedicated or commTxPoolNormal. The commTxPoolExceptional can also be included in dedicated signaling (RRCConnectionReconfiguration message). In the RRCConnectionReconfiguration message, the commTxPoolNormal (if included) can be included in entry of inter frequency information list (InterFreqInfoList) for the frequency in which UE want to transmit SL V2V/V2X communication. In the SI, the commTxPoolExceptional (if included) for non-serving frequency can be included in entry of inter frequency information list (InterFreqInfoList) for the frequency in which UE want to transmit SL V2V/V2X communication. In the SI, the commTxPoolExceptional (if included) for serving frequency (i.e. frequency of Pcell) can be included as part of common configuration.

The interruption between connection initiation and reception of commTxPoolNormalDedicated or commTxPoolNormal in RRCConnectionReconfiguration can be reduced by relaxing the sensing time for commTxPoolExceptional. UE can select the resource from commTxPoolExceptional without sensing. Alternately UE can select the resource from commTxPoolExceptional after shorter sensing duration. The sensing duration for commTxPoolExceptional can be much smaller than normal Tx pools.

Figure 16:
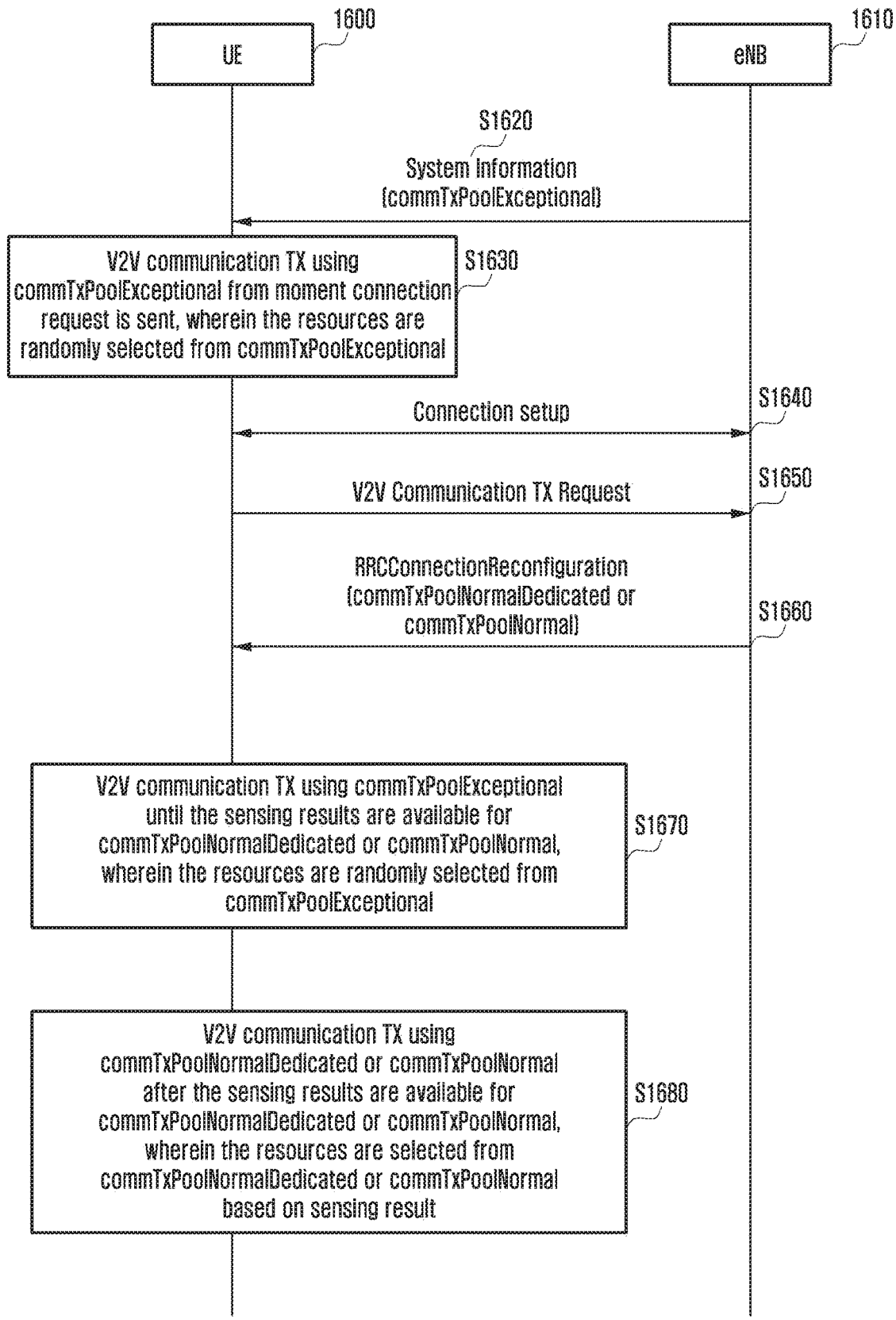
FIG. 16 is a flowchart illustrating the first embodiment of scenario 2 according to an embodiment of the present disclosure.

FIG. 16 is a flowchart illustrating the first embodiment of scenario 2 according to an embodiment of the present disclosure.

UE 1600 receives SI including exceptional transmission resource pool i.e. commTxPoolExceptional from eNB 1610 at operation S1620. UE is performing SL V2V/V2X communication transmission using commTxPoolExceptional received in SI from the moment when RRC connection request is transmitted at operation S1630. The resources are randomly selected from commTxPoolExceptional. UE transitions from RRC IDLE to RRC CONNECTED state for WAN communication by connection setup at operation S1640 and requests resources for SL V2V/V2X communication transmission at operation S1650. UE receives Common TX resource pool i.e. commTxPoolNormalDedicated or commTxPoolNormal in dedicated signaling i.e. RRCConnectionReconfiguration message at operation S1660. UE continues to use commTxPoolExceptional until sensing results are available for commTxPoolNormalDedicated or commTxPoolNormal at operation S1670. The resources are randomly selected from commTxPoolExceptional. After the sensing results are available, UE performs SL V2V/V2X communication transmission using commTxPool-NormalDedicated or commTxPoolNormal in dedicated signaling i.e. RRCConnectionReconfiguration message at operation S1680. The resources are selected from commTx-PoolNormalDedicated or commTxPoolNormal based on sensing result.

In second embodiment of scenario 2, in order to reduce this interruption due to sensing, after receiving the commTxPoolNormalDedicated or commTxPoolNormal in dedicated signaling i.e. RRCConnectionReconfiguration message, UE can use the commTxPoolNormalDedicated or commTxPoolNormal after receiving the RRCConnectionReconfiguration without sensing while it is performing sensing on commTxPoolNormalDedicated or commTxPoolNormal. After sensing on commTxPoolNormalDedicated or commTxPoolNormal, UE can use commTxPoolNormalDedicated or commTxPoolNormal based on the sensing results. The interruption between connection initiation and reception of commTxPoolNormalDedicated or commTxPoolNormal in RRCConnectionReconfiguration can be reduced by allowing usage of commTxPoolExceptional with relaxed sensing time. UE can select the resource from commTxPoolExceptional without sensing. Alternately UE can select the resource from commTxPoolExceptional after shorter sensing duration. The sensing duration for commTxPoolExceptional can be much smaller than normal Tx pools. UE stops using commTxPoolException after receiving RRCConnectionReconfiguration message.

In third embodiment of the present disclosure for scenario 2, in order to reduce this interruption due to sensing, after receiving the commTxPoolNormalDedicated or commTxPoolNormal in dedicated signaling i.e. RRCConnectionReconfiguration message, UE can use the commTxPoolNormalDedicated or commTxPoolNormal after receiving the RRCConnectionReconfiguration with short sensing duration (e.g. 250 ms) for a defined time period T. T>=duration for normal sensing i.e. 1000 ms. The interruption between connection initiation and reception of commTxPoolNormalDedicated or commTxPoolNormal in RRCConnectionReconfiguration can be reduced by allowing usage of commTxPoolExceptional with short sensing time. UE can select the resource from commTxPoolExceptional without sensing. Alternately UE can select the resource from commTxPoolExceptional after shorter sensing duration. The sensing duration for commTxPoolExceptional can be much smaller than normal Tx pools. UE stops using commTxPoolException after receiving RRCConnectionReconfiguration message.

In fourth embodiment of the present disclosure for scenario 2, in order to reduce this interruption due to sensing, eNB can signal two sets of TX resource pool(s), commTxPoolNormalDedicated1 and commTxPoolNormalDedicated2 in dedicated signaling i.e. RRCConnectionReconfiguration message. After receiving the RRCConnectionReconfiguration UE starts sensing for commTxPoolNormalDedicated2 and uses commTxPoolNormalDedicated1 while UE is sensing commTxPoolNormalDedicated2. UE stops using commTxPoolException after receiving RRCConnectionReconfiguration message. UE stops using commTxPoolNormalDedicated1 after initial sensing is done for commTxPoolNormalDedicated2.

Figure 17:
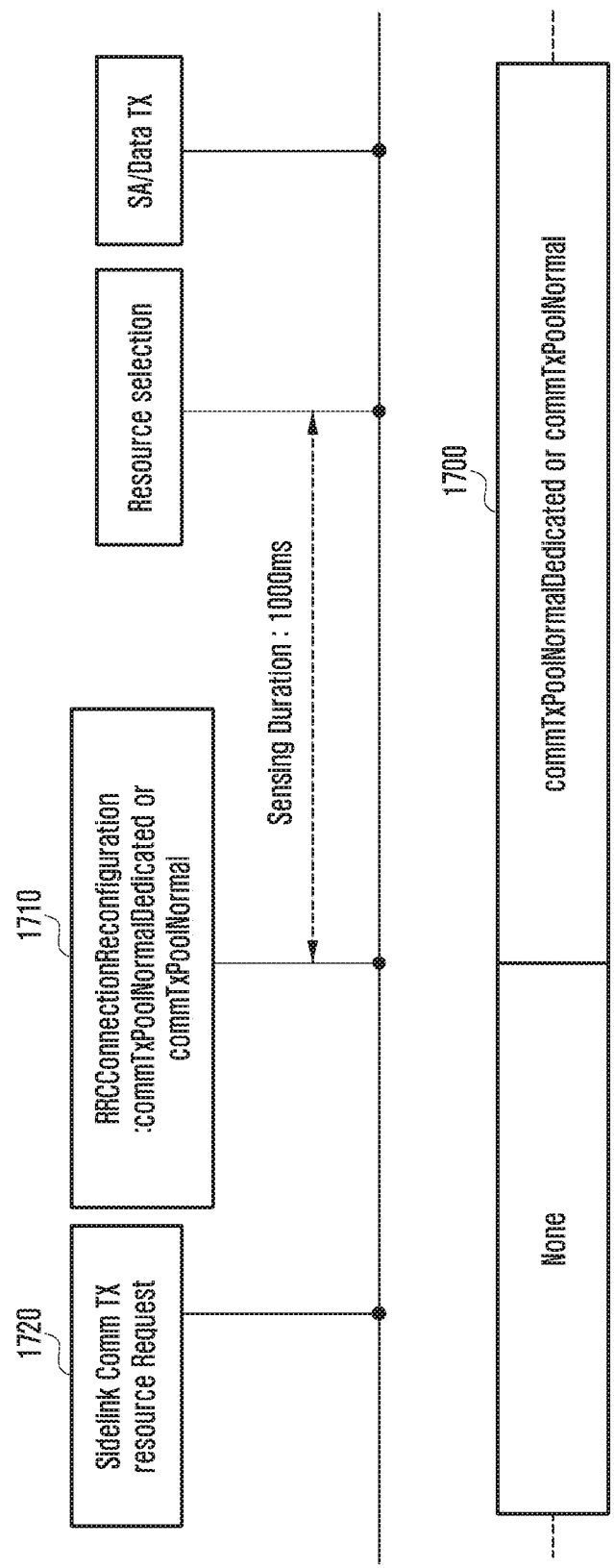
FIG. 17 illustrates an interruption of at least 1 s due to the sensing according to scenario 3 according to an embodiment of the present disclosure.

Scenario 3:

FIG. 17 illustrates an interruption of at least 1 s due to the sensing according to scenario 3 according to an embodiment of the present disclosure.

UE is in RRC CONNECTED. UE is interested in SL V2V/V2X communication transmission and requests SL common transmission resource 1720. UE receives Common TX resource pools i.e. commTxPoolNormalDedicated or commTxPoolNormal in dedicated signaling i.e. RRCConnectionReconfiguration message 1710. In this procedure, there is an interruption of at least 1 s due to sensing as UE can select resource from commTxPoolNormalDedicated or commTxPoolNormal only after sensing 1700. The same interruption will also occur when commTxPoolNormalDedicated or commTxPoolNormal configured by RRCConnectionReconfiguration message is reconfigured by another RRCConnectionReconfiguration message. In the RRCConnectionReconfiguration message, the commTxPoolNormal (if included) can be included in entry of inter frequency information list (InterFreqInfoList) for the frequency in which UE want to transmit SL V2V/V2X communication. The commTxPoolNormalDedicated is transmission resource pool for Pcell. The commTxPoolNormal is the transmission resource pool of frequency other than Pcell.

Figure 18:
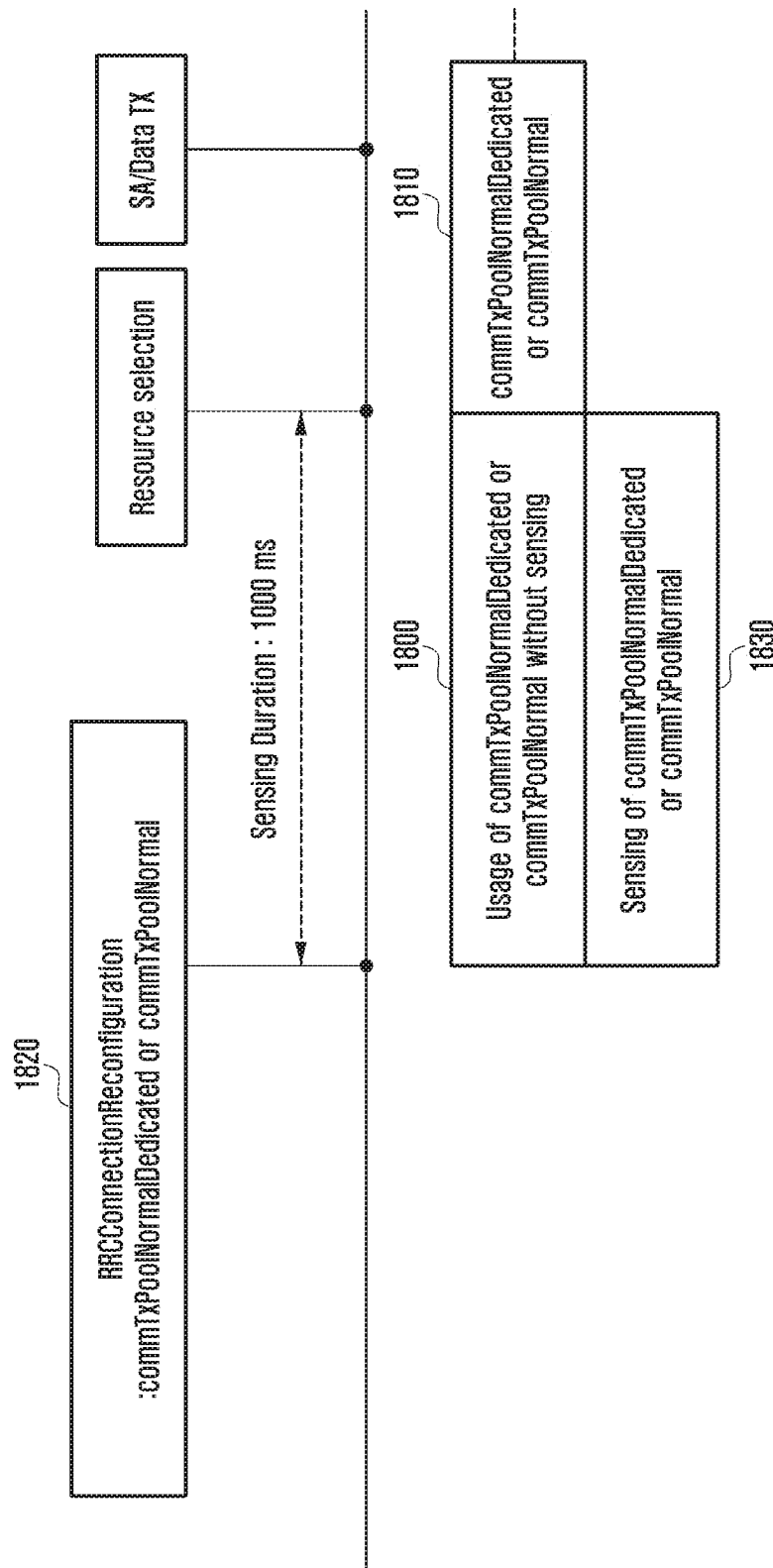
FIG. 18 illustrates the first embodiment of scenario 3 according to an embodiment of the present disclosure.

FIG. 18 illustrates the first embodiment of scenario 3 according to an embodiment of the present disclosure.

In order to reduce this interruption due to sensing, after receiving the commTxPoolNormalDedicated or commTxPoolNormal in dedicated signaling i.e. RRCConnectionReconfiguration message 1820, UE use the received commTxPoolNormalDedicated or commTxPoolNormal 1800 after receiving the RRCConnectionReconfiguration without sensing while it is performing initial sensing (for specified period) on commTxPoolNormalDedicated or commTxPoolNormal 1830. After the sensing results are available, UE can use the received commTxPoolNormalDedicated or commTxPoolNormal based on the sensing results 1810. If commTxPoolNormalDedicated or commTxPoolNormal was configured previously before receiving this RRCConnectionReconfiguration message, UE stops using that commTxPoolNormalDedicated or commTxPoolNormal after receiving this RRCConnectionReconfiguration message.

Figure 19:
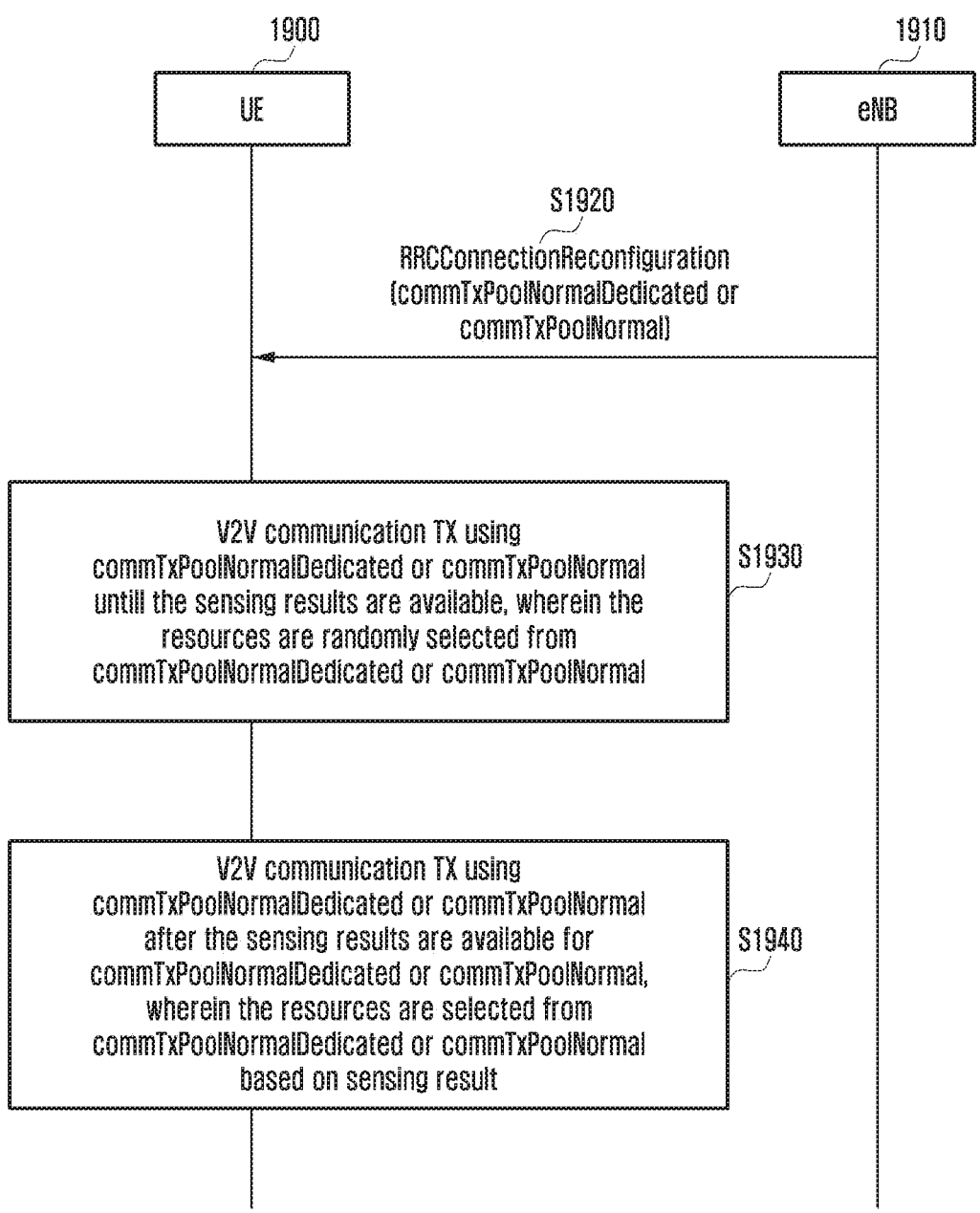
FIG. 19 is a flowchart illustrating the first embodiment of scenario 3 according to an embodiment of the present disclosure.

FIG. 19 is a flowchart illustrating the first embodiment of scenario 3 according to an embodiment of the present disclosure.

UE 1900 receives Common TX resource pool i.e. commTxPoolNormalDedicated or commTxPoolNormal in dedicated signaling i.e. RRCConnectionReconfiguration message from eNB 1910 at operation S1920. UE uses commTxPoolNormalDedicated or commTxPoolNormal until sensing results are available for commTxPoolNormalDedicated or commTxPoolNormal at operation S1930. The resources are randomly selected from commTxPoolNormalDedicated or commTxPoolNormal. After the sensing results are available, UE performs SL V2V/V2X communication transmission using commTxPoolNormalDedicated or commTxPoolNormal at operation S1940. The resources are selected from commTxPoolNormalDedicated or commTxPoolNormal based on sensing result.

Figure 20:
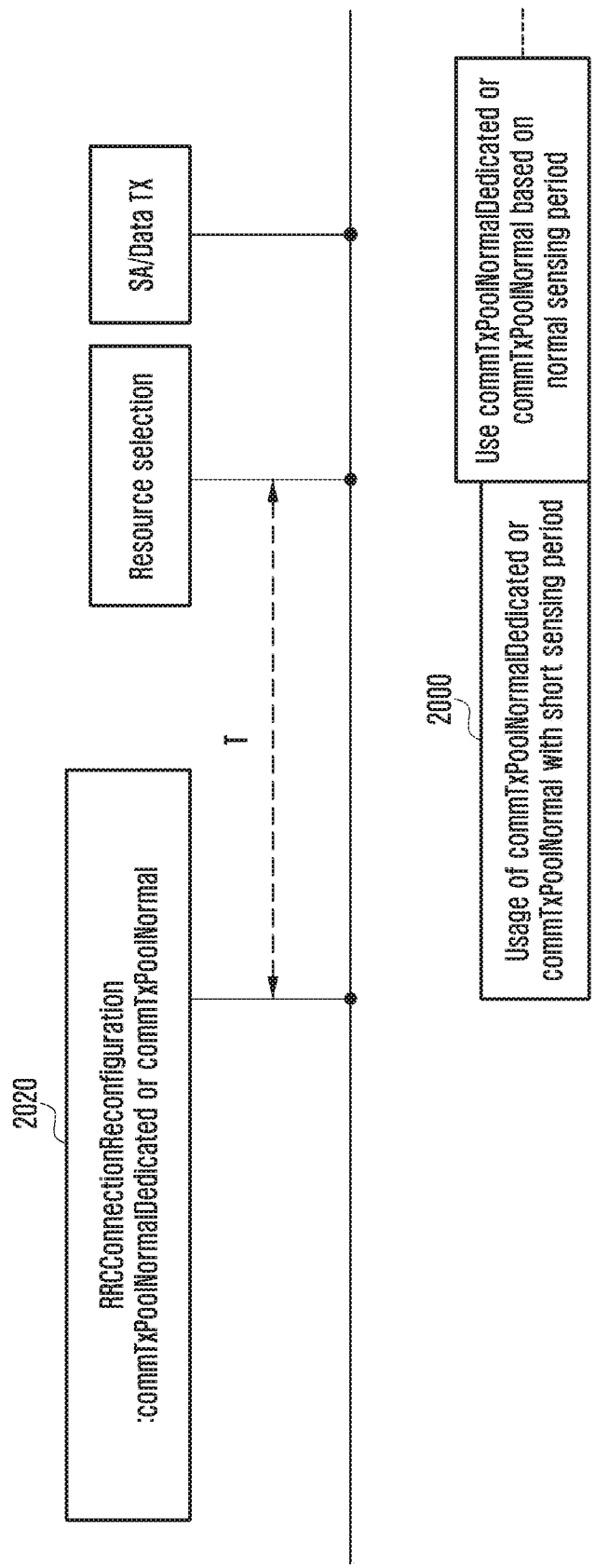
FIG. 20 illustrates the second embodiment of scenario 3 according to an embodiment of the present disclosure.

FIG. 20 illustrates the second embodiment of scenario 3 according to an embodiment of the present disclosure.

In order to reduce this interruption due to sensing, after receiving the commTxPoolNormalDedicated or commTxPoolNormal in dedicated signaling i.e. RRCConnectionReconfiguration message 2020, UE can use the received commTxPoolNormalDedicated or commTxPoolNormal after receiving the RRCConnectionReconfiguration with short sensing duration (e.g. 250 ms) for a defined time period T 2000. T>=duration for normal sensing i.e. 1000 ms. If commTxPoolNormalDedicated or commTxPoolNormal was configured previously before receiving this RRCConnectionReconfiguration message, UE stops using that commTxPoolNormalDedicated or commTxPoolNormal after receiving this RRCConnectionReconfiguration message.

Figure 21:
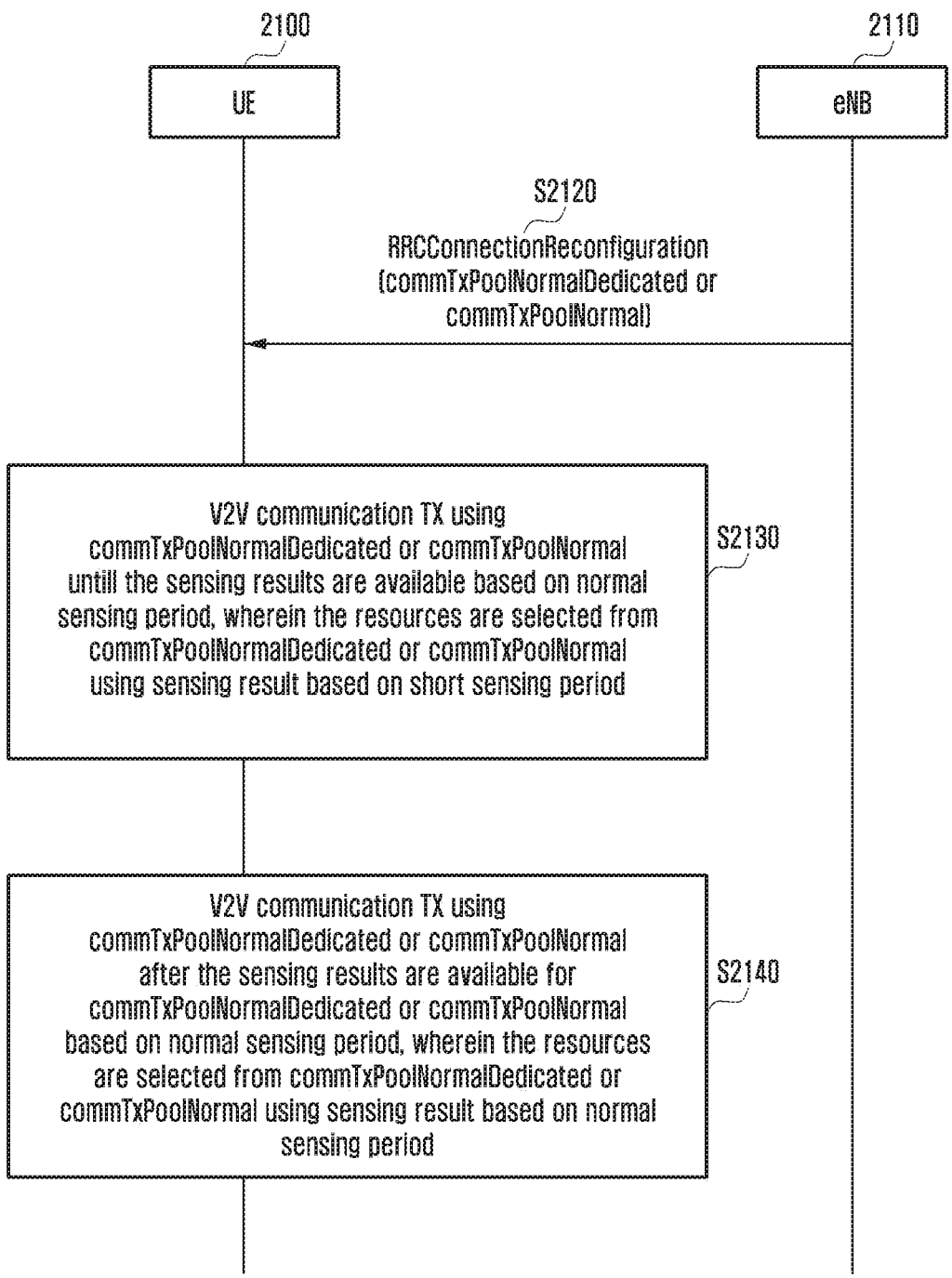
FIG. 21 is a flowchart illustrating the second embodiment of scenario 3 according to an embodiment of the present disclosure.

FIG. 21 is a flowchart illustrating the second embodiment of scenario 3 according to an embodiment of the present disclosure.

UE 2100 receives Common TX resource pool i.e. commTxPoolNormalDedicated or commTxPoolNormal in dedicated signaling i.e. RRCConnectionReconfiguration message from eNB 2110 at operation S2120. UE uses commTxPoolNormalDedicated or commTxPoolNormal when short sensing results are available for commTxPoolNormalDedicated or commTxPoolNormal at operation S2130. The resources are selected from commTxPoolNormalDedicated or commTxPoolNormal based on the short sensing results. After the normal sensing results are available, UE performs SL V2V/V2X communication transmission using commTxPoolNormalDedicated or commTxPoolNormal at operation S2140. The resources are selected from commTxPoolNormalDedicated or commTxPoolNormal based on the normal sensing result.

Figure 22:
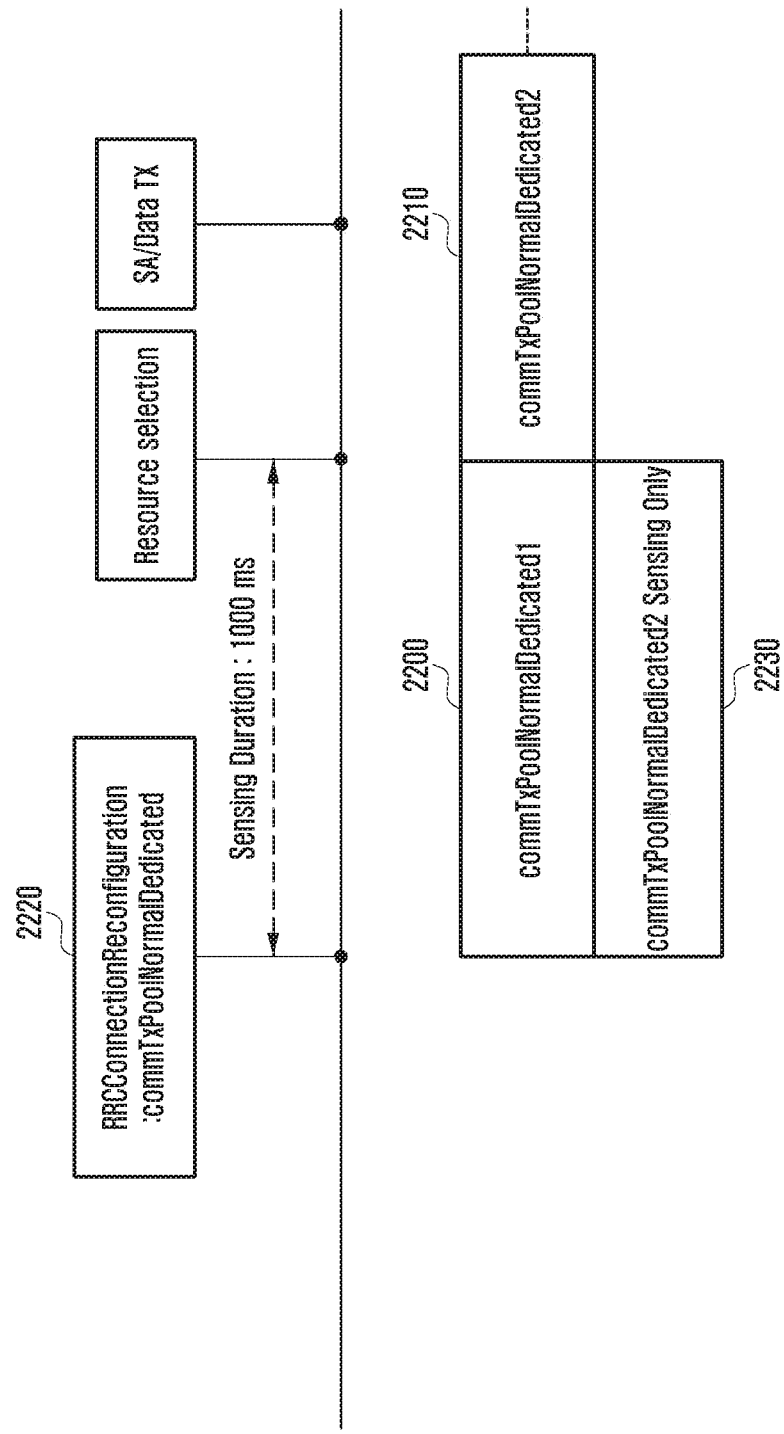
FIG. 22 illustrates the third embodiment of scenario 3 according to an embodiment of the present disclosure.

FIG. 22 illustrates the third embodiment of scenario 3 according to an embodiment of the present disclosure.

In order to reduce this interruption due to sensing, eNB can signal two sets of TX resource pool(s), commTxPoolNormalDedicated1 and commTxPoolNormalDedicated2 in dedicated signaling i.e. RRCConnectionReconfiguration message 2220. After receiving the RRCConnectionReconfiguration UE starts sensing for commTxPoolNormalDedicated2 and uses commTxPoolNormalDedicated1 2200 while UE is sensing commTxPoolNormalDedicated2 2230. UE stops using commTxPoolNormalDedicated1 after initial sensing is done for commTxPoolNormalDedicated2 2210. If commTxPoolNormalDedicated or commTxPoolNormal was configured previously before receiving this RRCConnectionReconfiguration message, UE stops using that commTxPoolNormalDedicated or commTxPoolNormal after receiving this RRCConnectionReconfiguration message.

Figure 23:
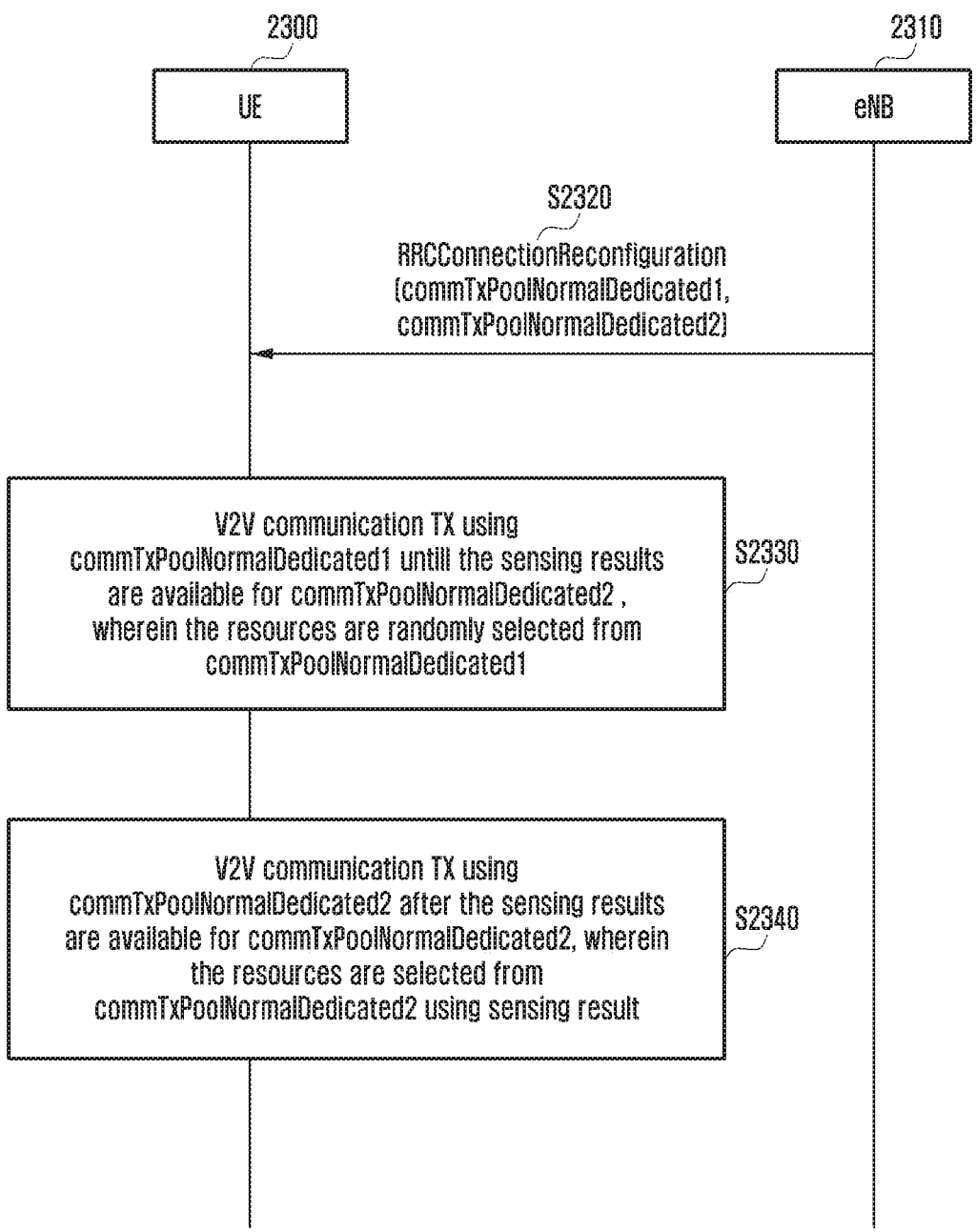
FIG. 23 is a flowchart illustrating the third embodiment of scenario 3 according to an embodiment of the present disclosure.

FIG. 23 is a flowchart illustrating the third embodiment of scenario 3 according to an embodiment of the present disclosure.

UE 2300 receives Common TX resource pool i.e. commTxPoolNormalDedicated1 and commTxPoolNormalDedicated2 or commTxPoolNormal1 and commTxPoolNormal2 in dedicated signaling i.e. RRCConnectionReconfiguration message from eNB 2310 at operation S2320. UE uses commTxPoolNormalDedicated1 or commTxPoolNormal1 when sensing results on commTxPoolNormalDedicated2 or commTxPoolNormal2 are available at operation S2330. The resources are randomly selected from commTxPoolNormalDedicated1 or commTxPoolNormal1. After the sensing results are available, UE performs SL V2V/V2X communication transmission using commTxPoolNormalDedicated2 or commTxPoolNormal2 at operation S2340. The resources are selected from commTxPoolNormalDedicated2 or commTxPoolNormal2 based on the normal sensing result.

Figure 24:
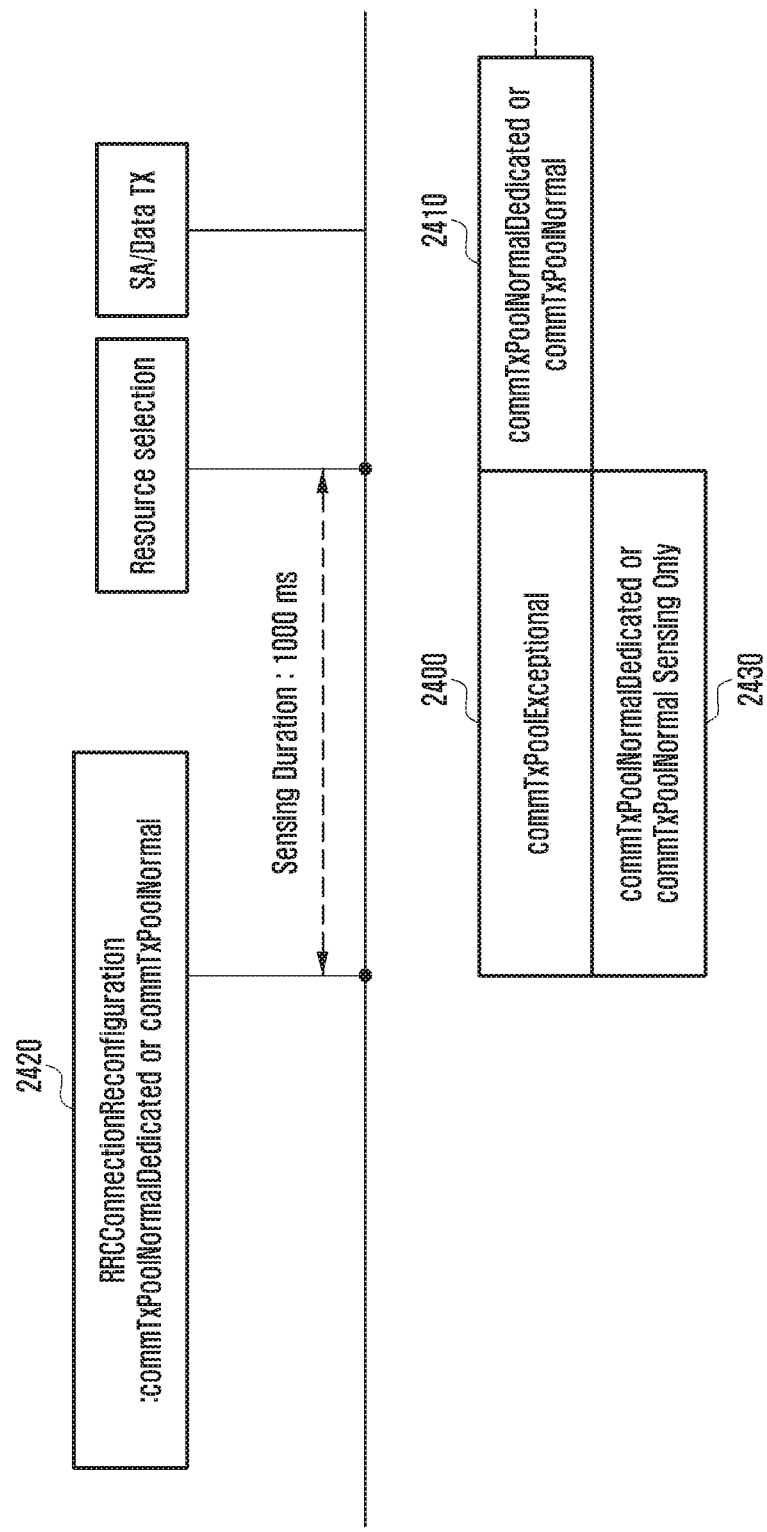
FIG. 24 illustrates the fourth embodiment of scenario 3 according to an embodiment of the present disclosure.

FIG. 24 illustrates the fourth embodiment of scenario 3 according to an embodiment of the present disclosure.

In order to reduce this interruption due to sensing, eNB can signal transmission resource pool configurations for autonomous resource selection i.e. commTxPoolNormalDedicated or commTxPoolNormal in dedicated signaling i.e. RRCConnectionReconfiguration message 2420 and exceptional transmission resource pool i.e. commTxPoolExceptional in broadcast signaling SI.

The commTxPoolExceptional can also be included in dedicated signaling (RRCConnectionReconfiguration message). In the RRCConnectionReconfiguration message, the commTxPoolNormal (if included) can be included in entry of inter frequency information list (InterFreqInfoList) for the frequency in which UE want to transmit SL V2V/V2X communication. In the SI, the commTxPoolExceptional (if included) for non-serving frequency can be included in entry of inter frequency information list (InterFreqInfoList) for the frequency in which UE want to transmit SL V2V/V2X communication. In the SI, the commTxPoolExceptional (if included) for serving frequency (i.e. frequency of Pcell) can be included as part of common configuration. In the RRCConnectionReconfiguration message, the commTxPoolExceptional (if included) can be included in entry of inter frequency information list (InterFreqInfoList) for the frequency in which UE want to transmit SL V2V/V2X communication.

After receiving the RRCConnectionReconfiguration, including transmission resource pool configurations for autonomous resource selection i.e. commTxPoolNormalDedicated or commTxPoolNormal, UE uses commTxPoolExceptional (if signaled either in broadcast or dedicated signaling for the concerned frequency) without sensing (i.e. randomly select resources from the resource pool) 2400 while UE is performing sensing on the resources included in commTxPoolNormalDedicated 2430. UE stops using commTxPoolExceptional after initial sensing is completed on the resources included in commTxPoolNormalDedicated or commTxPoolNormal 2410. No sensing is performed for usage of commTxPoolExceptional. Alternately sensing can be performed for commTxPoolExceptional wherein sensing period for commTxPoolExceptional can be smaller (pre-defined or signaled) than normal sensing duration. If commTxPoolNormalDedicated or commTxPoolNormal was configured previously before receiving this RRCConnectionReconfiguration message, UE stops using that commTxPoolNormalDedicated or commTxPoolNormal after receiving this RRCConnectionReconfiguration message.

Figure 25:
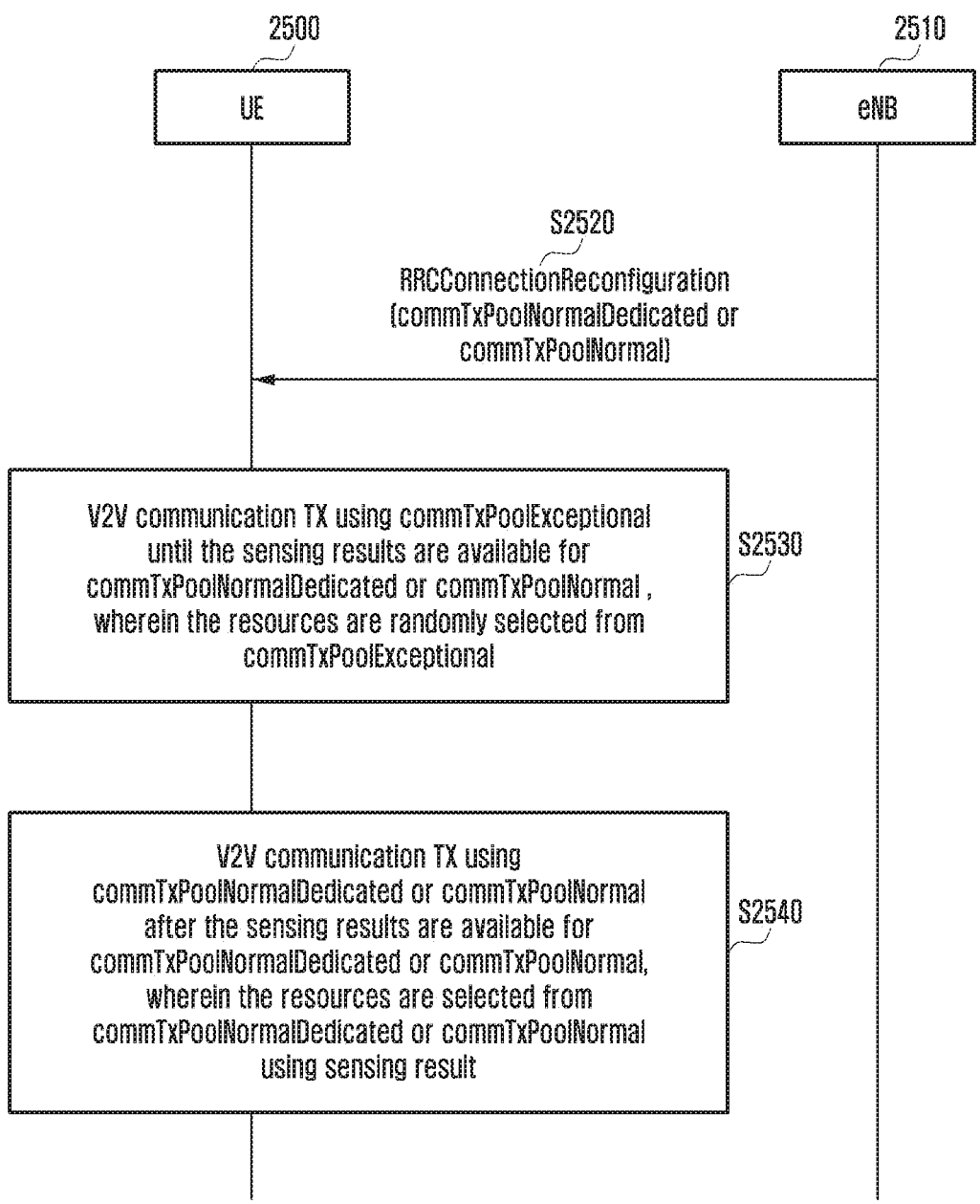
FIG. 25 is a flowchart illustrating the fourth embodiment of scenario 3 according to an embodiment of the present disclosure.

FIG. 25 is a flowchart illustrating the fourth embodiment of scenario 3 according to an embodiment of the present disclosure.

UE 2500 receives Common TX resource pool i.e. commTxPoolNormalDedicated or commTxPoolNormal in dedicated signaling i.e. RRCConnectionReconfiguration message from eNB 2510 at operation S2520. UE uses commTxPoolExceptional until the sensing results on commTxPoolNormalDedicated or commTxPoolNormal are available at operation S2530. The resources are randomly selected from commTxPoolExceptional. UE can receive commTxPoolExceptional by broadcast signaling or dedicated signaling. After the sensing results are available, UE performs SL V2V/V2X communication transmission using commTxPoolNormalDedicated or commTxPoolNormal at operation S2540. The resources are selected from commTxPoolNormalDedicated or commTxPoolNormal based on the sensing result.

Figure 26:
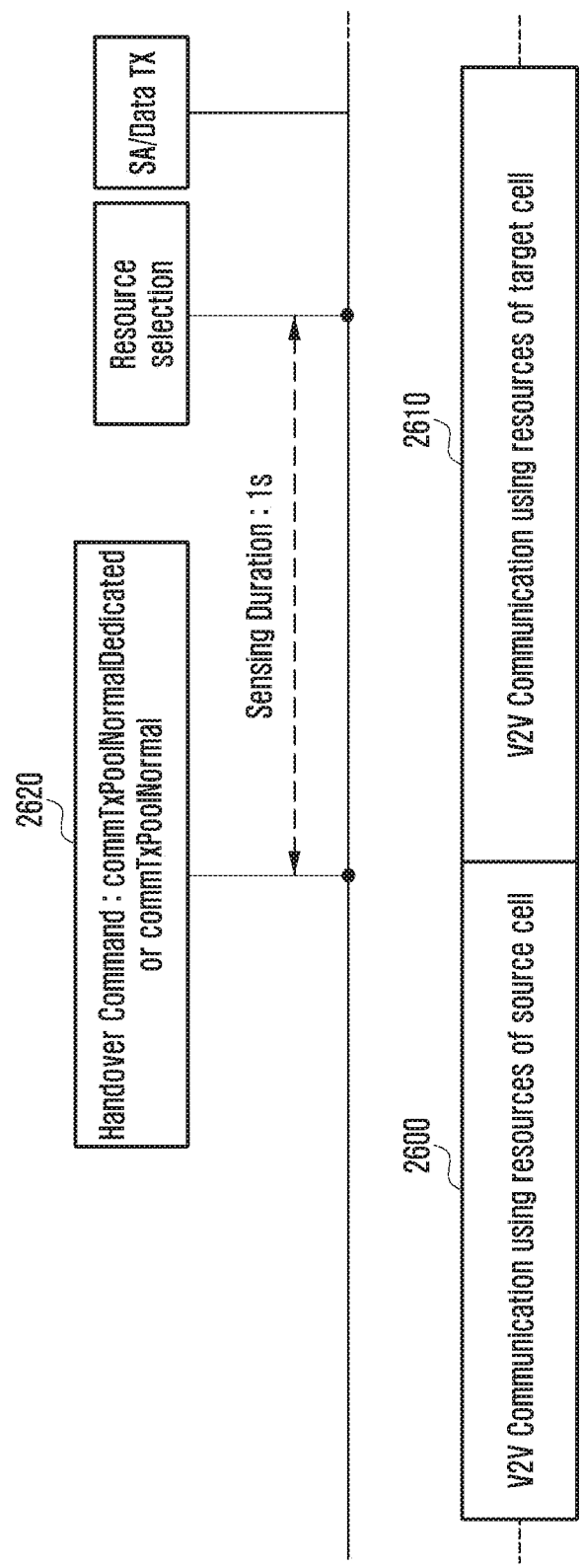
FIG. 26 illustrates an interruption of at least 1 s due to the sensing according to scenario 4 according to an embodiment of the present disclosure.

Scenario 4 (Handover):

FIG. 26 illustrates an interruption of at least 1 s due to the sensing according to scenario 4 according to an embodiment of the present disclosure.

UE is in RRC CONNECTED. UE is performing SL V2V/V2X communication transmission in source cell 2600. UE handovers from source cell to target cell. In the handover command (or RRCConnectionReconfiguration with mobilityControl IE) UE receives transmission resource pool configurations for autonomous resource selection i.e. commTx-PoolNormalDedicated or commTxPoolNormal 2620. In the handover command (or RRCConnectionReconfiguration), the commTxPoolNormal can be included in entry of inter frequency information list (InterFreqInfoList) for the frequency in which UE want to transmit SL V2V/V2X communication. The handover command is received by UE from source cell. In this procedure, there is an interruption of at least 1 s due to sensing, as UE can select resource from received commTxPoolNormalDedicated or commTxPool-Normal of target cell only after sensing 2610.

In the first embodiment of the present disclosure for scenario 4, in order to reduce this interruption due to sensing, after receiving the transmission resource pool configurations for autonomous resource selection i.e. commTx-PoolNormalDedicated or commTxPoolNormal in handover command (or RRCConnectionReconfiguration), UE can use i.e. select resource from commTxPoolNormalDedicated or commTxPoolNormal without sensing (i.e. randomly select resource from resource pool) while it is performing sensing on commTxPoolNormalDedicated or commTxPoolNormal. Once the initial sensing is completed, UE does not randomly select resource from commTxPoolNormalDedicated or commTxPoolNormal but select resources based on sensing result. In an example, duration for normal sensing can be 1000 ms. In the handover command (or RRCConnection-Reconfiguration), the commTxPoolNormal can be included in inter frequency information list (InterFreqInfoList). UE uses the commTxPoolNormal in the entry of InterFreqInfo-List for the frequency in which UE want to transmit SL V2V/V2X communication.

In the second embodiment of the present disclosure for scenario 4, in order to reduce this interruption due to sensing, after receiving the transmission resource pool configurations for autonomous resource selection i.e. commTx-PoolNormalDedicated or commTxPoolNormal in handover command, UE can use i.e. select resource from commTx-PoolNormalDedicated or commTxPoolNormal with short sensing duration (e.g. 250 ms) for a defined time period T. T<duration for normal sensing. In an example, duration for normal sensing can be 1000 ms. In the handover command (or RRCConnectionReconfiguration), the commTxPoolNormal can be included in inter frequency information list (InterFreqInfoList). UE uses the commTxPoolNormal in the entry of InterFreqInfoList for the frequency in which UE want to transmit SL V2V/V2X communication.

In the third embodiment of the present disclosure for scenario 4, in order to reduce this interruption due to sensing, two sets of TX resource pool(s), commTxPool-NormalDedicated1 or commTxPoolNormal1 and commTx-PoolNormalDedicated2 or commTxPoolNormal2 can be signaled in handover command. UE uses commTxPool-NormalDedicated1 or commTxPoolNormal1 without sensing (i.e. randomly select resource from resource pool) while UE is sensing commTxPoolNormalDedicated2 or commTx-PoolNormal2. UE stops using commTxPoolNormalDedicated1 or commTxPoolNormal1 after initial sensing is done for commTxPoolNormalDedicated2 or commTxPoolNormal2. In an example, duration for initial sensing can be 1000 ms. In the handover command (or RRCConnectionReconfiguration), the commTxPoolNormal1 and commTxPool-Normal2 can be included in inter frequency information list (InterFreqInfoList). UE uses the commTxPoolNormal1 and commTxPoolNormal2 in the entry of InterFreqInfoList for the frequency in which UE want to transmit SL V2V/V2X communication.

In the fourth embodiment of the present disclosure for scenario 4, transmission resource pool configurations for autonomous resource selection i.e. commTxPool-NormalDedicated or commTxPoolNormal are signaled in handover command (or RRCConnectionReconfiguration message). In the handover command (or RRCConnection-Reconfiguration message), the commTxPoolNormal can be included in entry of InterFreqInfoList for the frequency in which UE want to transmit SL V2V/V2X communication. The source cell can signal exceptional transmission resource pool i.e. commTxPoolExceptional in broadcast signaling i.e. SI or in dedicated signaling i.e. RRCConnectionReconfiguration message. UE uses commTxPoolExceptional provided source cell without sensing (i.e. randomly select resource from resource pool) from the reception of handover command. Alternately sensing can be performed for commTx-PoolExceptional wherein sensing period for commTx-PoolExceptional can be smaller (pre-defined or signaled) than normal sensing duration. UE can initiate sensing of commTxPoolExceptional when source cell signal quality goes below a threshold, or when TTT is started or when target cell quality is above source quality by a threshold, or target cell quality is above a threshold. UE continue to use commTxPoolExceptional until the initial sensing is completed on commTxPoolNormalDedicated or commTxPool-Normal received in handover command (or RRCConnectionReconfiguration message). In case scheduled resource allocation is indicated in handover command, UE continue to use commTxPoolExceptional until the handover is completed i.e. until the timer associated with handover is running.

In the fifth embodiment of the present disclosure for scenario 4, in order to reduce this interruption due to sensing, an exceptional transmission resource pool i.e. commTxPoolExceptional can be signaled in addition to transmission resource pool configurations for autonomous resource selection i.e. commTxPoolNormalDedicated or commTxPoolNormal of target cell in handover command (or RRCConnectionReconfiguration message). In the handover command (or RRCConnectionReconfiguration message), the commTxPoolNormal can be included in entry of InterFreqInfoList for the frequency in which UE want to transmit SL V2V/V2X communication. In the handover command (or RRCConnectionReconfiguration), the commTxPoolNormal can be included in entry of inter frequency information list (InterFreqInfoList) for the frequency in which UE want to transmit SL V2V/V2X communication. If commTxPoolExceptional is received in handover command (or RRCConnectionReconfiguration message), UE uses commTxPoolExceptional without sensing (i.e. randomly select resource from resource pool) from the reception of handover command. Alternately sensing can be performed for commTxPoolExceptional wherein sensing period for commTxPoolExceptional can be smaller (pre-defined or signaled) than normal sensing duration. UE continue to use commTxPoolExceptional until the initial sensing is completed on commTxPoolNormalDedicated or commTxPool-Normal received in handover command (or RRCConnectionReconfiguration message).

Figure 27:
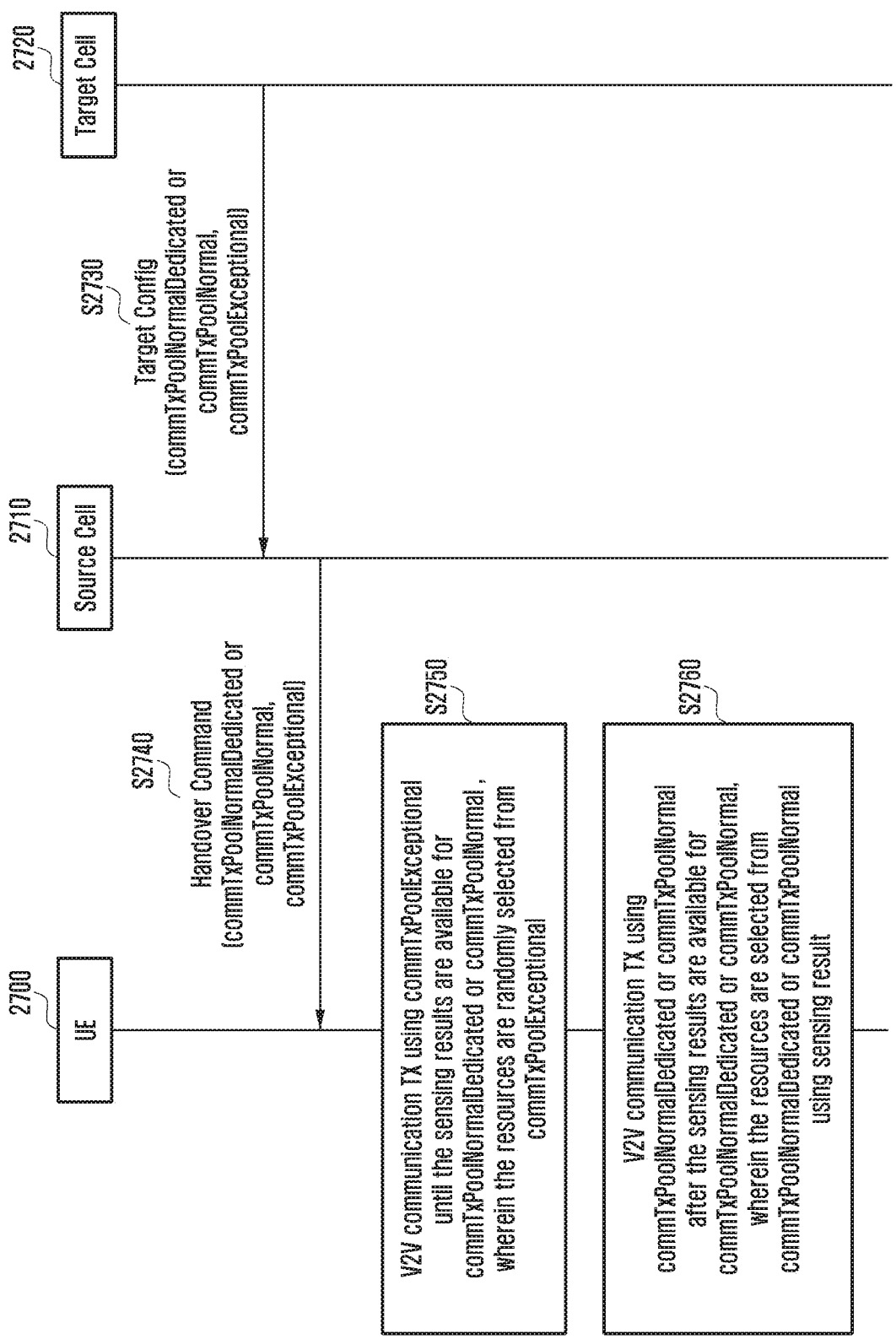
FIG. 27 is a flowchart illustrating the fifth embodiment of scenario 4 according to an embodiment of the present disclosure.

FIG. 27 is a flowchart illustrating the fifth embodiment of scenario 4 according to an embodiment of the present disclosure.

Target cell 2720 transmits transmission resource pool configurations for autonomous resource selection i.e. commTxPoolNormalDedicated or commTxPoolNormal of target cell in Target Configuration to Source cell 2710 at operation S2730. Transmission resource pool configurations further comprises commTxPoolExceptional. Source cell transmits handover command to a UE 2700 at operation S2740. In the handover command (or RRCConnectionReconfiguration message), commTxPoolNormalDedicated or commTxPoolNormal and commTxPoolExceptional can be included. If commTxPoolExceptional is received in handover command (or RRCConnectionReconfiguration message), UE can perform SL V2V/V2X communication transmission using commTxPoolExceptional until the sensing results on commTxPoolNormalDedicated or commTxPoolNormal is available at operation S2750. The resources are randomly selected from commTxPoolExceptional. After the sensing results are available, UE performs SL V2V/V2X communication transmission using commTxPoolNormalDedicated or commTxPoolNormal at operation S2760. The resources are selected from commTxPoolNormalDedicated or commTxPoolNormal based on sensing result.

In the sixth embodiment of the present disclosure for scenario 4, in order to reduce this interruption due to sensing, an exceptional transmission resource pool i.e. commTxPoolExceptional is signaled in addition to resource pool configuration of target cell for scheduled resource allocation in handover command (or RRCConnectionReconfiguration message). In the handover command (or RRCConnectionReconfiguration), the commTxPoolNormal can be included in entry of inter frequency information list (InterFreqInfoList) for the frequency in which UE want to transmit SL V2V/V2X communication. If commTxPoolExceptional is received in handover command (or RRCConnectionReconfiguration message), UE uses commTxPoolExceptional without sensing (i.e. randomly select resource from resource pool) from the reception of handover command. Alternately sensing can be performed for commTxPoolExceptional wherein sensing period for commTxPoolExceptional can be smaller (pre-defined or signaled) than normal sensing duration. UE continue to use commTxPoolExceptional until the handover is completed i.e. until the timer (i.e. T304, T304 is started by UE when handover command is received from source cell and stopped when handover to target cell is successfully completed) associated with handover is running. In other words if T304 is running, UE uses commTxPoolExceptional without sensing i.e. random selection.

Figure 28:
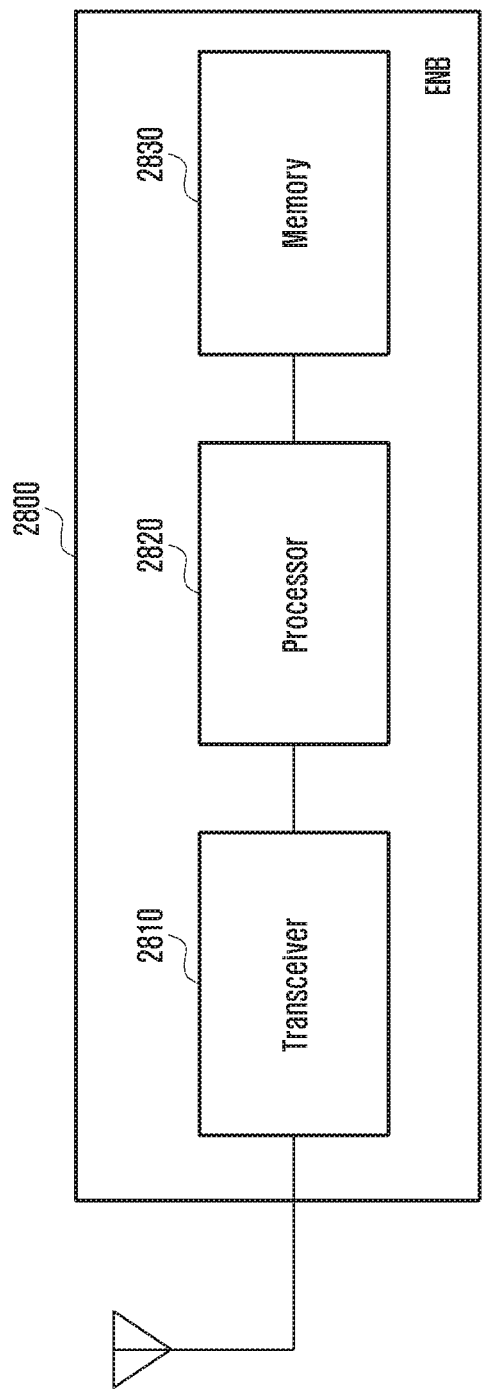
FIG. 28 illustrates an evolved Node B (eNB) apparatus according to an embodiment of the present disclosure.

FIG. 28 illustrates an eNB apparatus according to an embodiment of the present disclosure.

Referring to FIG. 28, the eNB 2800 includes a transceiver 2810, a processor 2820 and a memory 2830. Alternatively, the transceiver may be implemented as a transmitter and a receiver, and each component may be implemented through one or more processors. The transceiver can transmit transmission resource pool information to a UE and the memory can store transmission resource pool information. The processor is configured to determine transmission resource pool of the UE and control the transceiver and the memory according to various embodiments of the present disclosure. A processor 2820 can include at plural processors.

Figure 29:
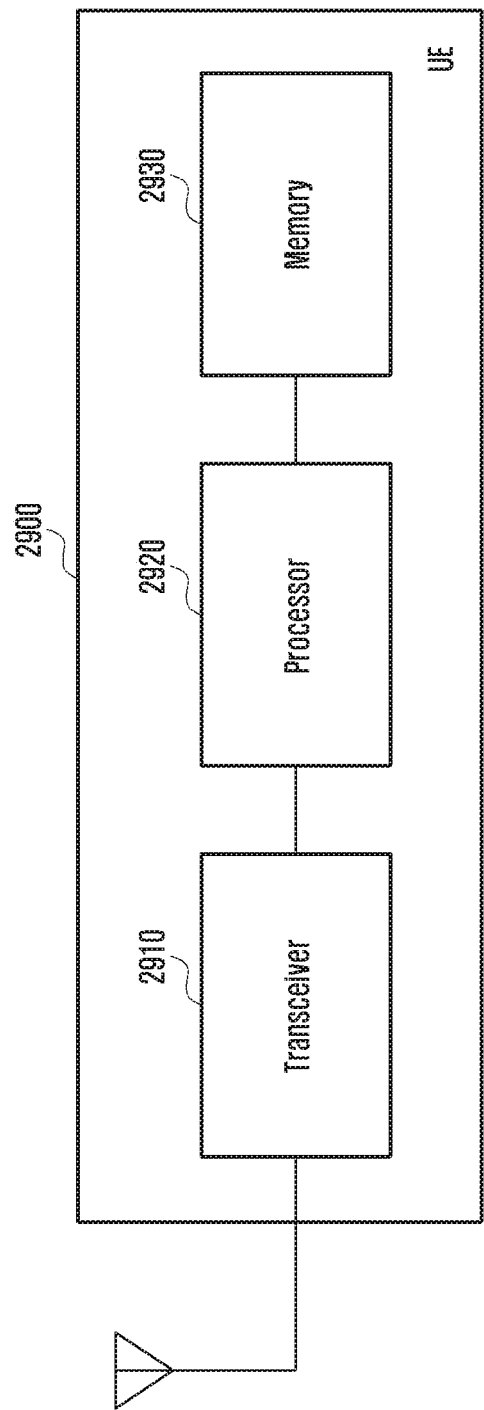
FIG. 29 illustrates a UE apparatus according to an embodiment of the present disclosure.

FIG. 29 illustrates a UE apparatus according to an embodiment of the present disclosure.

Referring to FIG. 29, the UE 2900 includes a transceiver 2910, a processor 2920 and a memory 2930. Alternatively, the transceiver may be implemented as a transmitter and a receiver, and each component may be implemented through one or more processors. The transceiver can receive transmission resource pool information from an eNB and transmit scheduling information and data for V2V/V2X communication using resources in the transmission resource pool. The memory can store transmission resource pool information. The processor is configured to determine resources in the transmission resource pool randomly or perform sensing on the transmission resource pool and determine resources in the transmission resource pool based on the sensing results and control the transceiver and the memory according to various embodiments of the present disclosure. A processor 2920 can include at plural processors.

The above-described various embodiments of the present disclosure and the accompanying drawings have been provided only as specific examples in order to assist in understanding the present disclosure and do not limit the scope of the present disclosure. Accordingly, those skilled in the art to which the present disclosure pertains will understand that other change examples based on the technical idea of the present disclosure may be made without departing from the scope of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting data of a user equipment (UE), the method comprising:
receiving a handover command message from a base station, the handover command message comprising information on a first normal resource pool;
based on the handover command message further comprising information on a first exceptional resource pool, randomly selecting a resource from the first exceptional resource pool, wherein the resource from the first exceptional resource pool is for transmitting a scheduling assignment (SA) and data corresponding to the SA from the first exceptional resource pool; and
transmitting the SA and the data based on the randomly selected resource from the first exceptional resource pool.

2. The method of claim 1, further comprising:
based on an initial sensing on the first normal resource pool being completed, selecting a resource from the first normal resource pool based on a sensing result on the first normal resource pool, wherein the resource from the first normal resource pool is for transmitting an SA and data from the first normal resource pool; and
transmitting the SA and the data based on the selected resource from the first normal resource pool.

3. The method of claim 1, wherein the first exceptional resource pool is used for transmitting the SA and the data until the initial sensing is completed on the first normal resource pool.

4. The method of claim 1, wherein the first normal resource pool comprises a transmission resource pool for an autonomous resource selection.

5. The method of claim 1,
wherein the information on the first normal resource pool comprises commTxPoolNormalDedicated or commTxPoolNormal, and
wherein the information on the first exceptional resource pool comprises commTxPoolExceptional.

6. The method of claim 1, further comprising:
receiving a radio resource control (RRC) message comprising information on a second normal resource pool;
based on the UE receiving information on a second exceptional resource pool and a sensing result on the second normal resource pool being not available, randomly selecting a resource from the second exceptional resource pool, wherein the resource from the second exceptional resource pool is for transmitting an SA and data from the second exceptional resource pool; and transmitting the SA and the data based on the randomly selected resource from the second exceptional resource pool.

7. The method of claim 6, further comprising:
based on the sensing result on the second normal resource pool being available, selecting a resource from the second normal resource pool based on the sensing result; and
transmitting an SA and data on the selected resource from the second normal resource pool.

8. The method of claim 6, wherein the second exceptional resource pool is used for transmitting the SA and the data until a sensing is completed on the second normal resource pool.

9. The method of claim 6, wherein the information on the second exceptional resource pool is received by system information (SI).

10. The method of claim 6, wherein the information on the second exceptional resource pool is received by the RRC message.

11. The method of claim 6,
wherein the information on the second normal resource pool comprises commTxPoolNormalDedicated or commTxPoolNormal, and
wherein the information on the second exceptional resource pool comprises commTxPoolExceptional.

12. A method for transmitting information of a base station, the method comprising:
receiving information on at least one resource pool from another base station; and
based on the information on the at least one resource pool, transmitting a handover command message comprising information on a first normal resource pool and information on a first exceptional resource pool,
wherein a resource randomly selected from the first exceptional resource pool is used for transmitting a scheduling assignment (SA) and data corresponding to the SA until an initial sensing is completed on the first normal resource pool.

13. The method of claim 12,
wherein the information on the first normal resource pool comprises commTxPoolNormalDedicated or commTxPoolNormal, and
wherein the information on the first exceptional resource pool comprises commTxPoolExceptional.

14. The method of claim 12, further comprising:
transmitting a radio resource control (RRC) message comprising information on a second normal resource pool; and
transmitting information on a second exceptional resource pool by the RRC message or system information (SI),
wherein a resource randomly selected from the second exceptional resource pool is used for transmitting an SA and data from the second exceptional resource pool until a sensing result on the second normal resource pool is available.

15. The method of claim 14,
wherein the information on the second normal resource pool comprises commTxPoolNormalDedicated or commTxPoolNormal, and
wherein the information on the second exceptional resource pool comprises commTxPoolExceptional.

16. A user equipment (UE) for transmitting data, the UE comprising:

a transceiver configured to transmit and receive signals; and
at least one processor configured to:
receive a handover command message from a base station, the handover command message comprising information on a first normal resource pool,
based on the handover command message further comprising information on a first exceptional resource pool, randomly select a resource from the first exceptional resource pool, wherein the resource from the first exceptional resource pool is for transmitting a scheduling assignment (SA) and data corresponding to the SA from the first exceptional resource pool, and
transmit the SA and the data based on the randomly selected resource of the first exceptional resource pool.

17. The UE of claim 16, wherein the at least one processor is further configured to:
based on an initial sensing on the first normal resource pool being completed, select a resource from the first normal resource pool based on a sensing result on the first normal resource pool, wherein the resource from the first normal resource pool is for transmitting an SA and data from the first normal resource pool, and
transmit the SA and the data based on the selected resource from the first normal resource pool.

18. The UE of claim 16, wherein the first exceptional resource pool is used for transmitting the SA and the data until the initial sensing is completed on the first normal resource pool.

19. The UE of claim 16, wherein the first normal resource pool comprises a transmission resource pool for an autonomous resource selection.

20. The UE of claim 16,
wherein the information on the first normal resource pool comprises commTxPoolNormalDedicated or commTxPoolNormal, and
wherein the information on the first exceptional resource pool comprises commTxPoolExceptional.

21. The UE of claim 16, wherein the at least one processor is further configured to:
receive a radio resource control (RRC) message comprising information on a second normal resource pool,
based on the UE receiving information on a second exceptional resource pool and a sensing result on the second normal resource pool being not available, randomly select a resource from the second exceptional resource pool, wherein the resource from the second exceptional resource pool is for transmitting an SA and data from the second exceptional resource pool, and
transmit the SA and the data based on the randomly selected resource from the second exceptional resource pool.

22. The UE of claim 21, wherein the at least one processor is further configured to:
based on the sensing result on the second normal resource pool being available, select a resource from the second normal resource pool based on the sensing result, and
transmit an SA and data on the selected resource from the second normal resource pool.

23. The UE of claim 21, wherein the second exceptional resource pool is used for transmitting the SA and the data until a sensing is completed on the second normal resource pool.

24. The UE of claim 21, wherein the information on the second exceptional resource pool is received by system information (SI).

25. The UE of claim 21, wherein the information on the second exceptional resource pool is received by the RRC message.

26. The UE of claim 21,
wherein the information on the second normal resource pool comprises commTxPoolNormalDedicated or commTxPoolNormal, and
wherein the information on the second exceptional resource pool comprises commTxPoolExceptional.

27. A base station for transmitting information, the base station comprising:
a transceiver configured to transmit and receive signals; and
at least one processor coupled with the transceiver and configured to:
receive information on at least one resource pool from another base station, and
based on the information on the at least one resource pool, transmit a handover command message comprising information on a first normal resource pool and information on a first exceptional resource pool,
wherein a resource randomly selected from the first exceptional resource pool is used for transmitting a scheduling assignment (SA) and data corresponding to the SA until an initial sensing is completed on the first normal resource pool.

28. The base station of claim 27,
wherein the information on the first normal resource pool comprises commTxPoolNormalDedicated or commTxPoolNormal, and
wherein the information on the first exceptional resource pool comprises commTxPoolExceptional.

29. The base station of claim 27, wherein the at least one processor is further configured to:
transmit a radio resource control (RRC) message comprising information on a second normal resource pool, and
transmit information on a second exceptional resource pool by the RRC message or system information (SI),
wherein a resource randomly selected from the second exceptional resource pool is used for transmitting an SA and data from the second exceptional resource pool until a sensing result on the second normal resource pool is available.

30. The base station of claim 29,
wherein the information on the second normal resource pool comprises commTxPoolNormalDedicated or commTxPoolNormal, and
wherein the information on the second exceptional resource pool comprises commTxPoolExceptional.

* * * * *